US008453500B2

(12) United States Patent
Honda et al.

(10) Patent No.: US 8,453,500 B2
(45) Date of Patent: Jun. 4, 2013

(54) TIRE SYSTEM

(75) Inventors: Makoto Honda, Tokyo (JP); Takeshi Bessho, Toyota (JP)

(73) Assignees: Toyota Info Technology Center Co., Ltd., Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 110 days.

(21) Appl. No.: 13/111,946

(22) Filed: May 19, 2011

(65) Prior Publication Data
US 2012/0291537 A1  Nov. 22, 2012

(51) Int. Cl.
G01M 17/02 (2006.01)

(52) U.S. Cl.
USPC .......................................................... 73/146

(58) Field of Classification Search
USPC .................................................. 73/146–146.8
See application file for complete search history.

(56) References Cited

U.S. PATENT DOCUMENTS

| | | | |
|---|---|---|---|
| 6,860,303 B2 | 3/2005 | Rensel et al. | |
| 6,951,143 B1 | 10/2005 | Adderton et al. | |
| 7,171,849 B2* | 2/2007 | Kandler | 73/146.5 |
| 7,770,444 B2* | 8/2010 | Bertrand | 73/146.5 |
| 7,916,012 B2* | 3/2011 | Fagot-Revurat et al. | 340/447 |
| 2006/0207319 A1* | 9/2006 | Krozer et al. | 73/146 |
| 2007/0095446 A1* | 5/2007 | Mancosu et al. | 152/152.1 |
| 2007/0240501 A1* | 10/2007 | Mancosu et al. | 73/146 |
| 2007/0256485 A1 | 11/2007 | Rensel et al. | |
| 2007/0295069 A1* | 12/2007 | Mancosu et al. | 73/146 |
| 2009/0114005 A1* | 5/2009 | Blixhavn et al. | 73/146.5 |
| 2009/0243830 A1* | 10/2009 | Heise et al. | 340/447 |
| 2009/0277262 A1 | 11/2009 | Rensel et al. | |
| 2010/0084071 A1* | 4/2010 | Sandstrom | 152/541 |
| 2012/0111470 A1* | 5/2012 | Scarpitti et al. | 152/548 |

OTHER PUBLICATIONS

Sekitani, Tsuyoshi, Noguchi, Yoshiaki, Nakano, Shintaro, Zaitsu, Koichiro, Kato, Yusaku, Takamiya, Makoto, Sakurai, Takayasu, Someya, Takao, "Communication Sheets Using Printed Organic Nonvolatile Memories", IEEE, 2007, 4 pages.
Bayraktaroglu, Burhan, Leedy, Kevin, Neidhard, Robert, "High Frequency ZnO Thin Film Transistors", IEEE, 2008, 2 pages.
Laukhina, E., Laukhin, V., Mas-Torrent, M., Creely, C.M., Petrov, D.V., Veciana, J., Rovira, C., "High Piezoresistive Organic Film for Plastic Pressure Sensors", The 14th International Conference on Solid-State Sensors, Actuators and Microsystems, Jun. 10-14, 2007, 3 pages, Lyon, France.
Someya, Takao, Sakurai, Takayasu, "Integration of Organic Field-Effect Transistors and Rubbery Pressure Sensors for Artificial Skin Applications", IEEE, 2003, 4 pages.
Koh, Soo Jin Adrian, Zhao, Xuanhe, Suo, Zhigang, "Maximal Energy That Can Be Converted By A Dielectric Elastomer Generator", American Institute of Physics, Jun. 30, 2009, 3 pages.

(Continued)

*Primary Examiner* — Andre Allen
(74) *Attorney, Agent, or Firm* — Patent Law Works LLP

(57) ABSTRACT

A system for measuring physical parameters of a tire, according to one embodiment of the present invention comprises a sensor layer and a circuit layer. The sensor layer is communicatively coupled to the circuit layer. The sensor layer is configured as a first thin film and embedded in the tire. The sensor layer provides a signal related to a physical parameter of the tire. The circuit layer is configured as a second thin film and embedded in the tire. The circuit layer processes the signal provided by the sensor layer.

19 Claims, 24 Drawing Sheets

OTHER PUBLICATIONS

Lu, Ming-Pei, Song, Jinhui, Lu, Ming-Yen, Chen, Min-Teng, Gao, Yifan, Chen, Lih-Juann, Wang, Zhong Lin, "Piezoelectric Nanogenerator Using p-Type ZnO Nanowire Arrays", NANO Letters, Georgia Tech Library and Information Center, Feb. 11, 2009, 6 pages.

Daniel, Jurgen, Ng, Tse Nga, Garner, Sean, Arias, Ana Claudia, Coleman, John, Liu, Jianzhong, Jackson, Ronald, "Pressure Sensors for Printed Blast Dosimeters", 5 pages.

Kim, Dae-Hyeong, Kim, Yun-Soung, Wu, Jian, Liu, Zhuangjian, Song, Jizhou, Kim, Hoon-Sik, Huang, Yonggang Y., Hwang, Keh-Chih, Rogers, John A., "Ultrathin Silicon Circuits With Strain-Isolation Layers and Mesh Layouts for High-Performance Electronics on Fabric, Vinyl, Leather, and Paper", Advanced Materials, vol. 21 No. 36, Sep. 25, 2009, 6 pages.

* cited by examiner

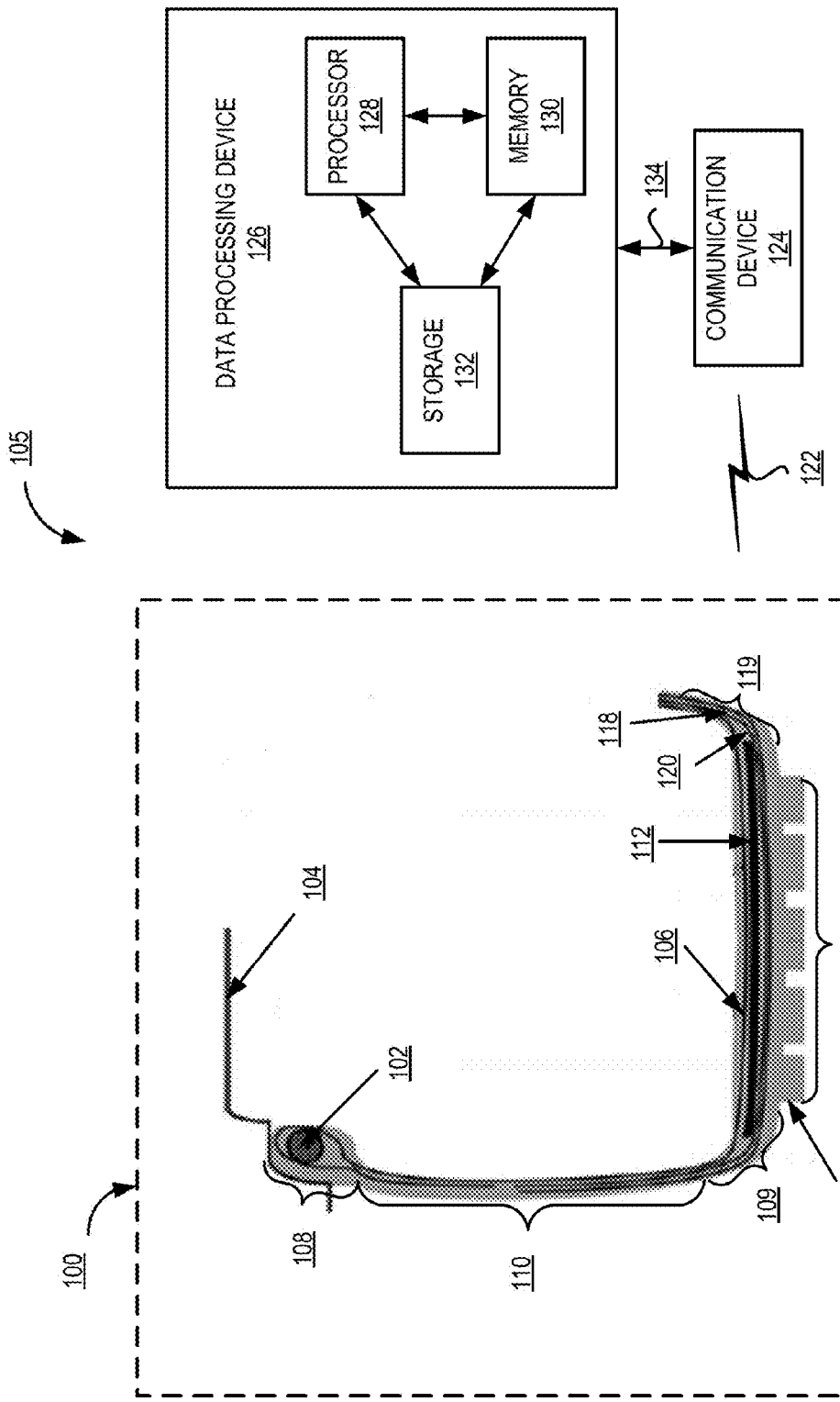

TIRE SYSTEM

BACKGROUND OF THE INVENTION

1. Field of the Invention

The present invention relates to sensors for measuring physical parameters. In particular, the present invention relates to a tire system for measuring physical parameters affecting a tire of an automobile.

2. Description of the Background Art

Automobile tires are usually subject to internal and external forces when in use. In order to evaluate the performance of a tire, it would be advantageous to be able to measure a variety of physical parameters (e.g., temperature, strain force, pressure, etc.) of the tire. Existing systems measure the physical parameters of the tire by embedding one or more sensors in the tire. These existing systems have difficulty measuring a variety of parameters with sufficient spatial resolution and accuracy for various reasons.

First, the sensors are only embedded on the ground-contacting surface of the tire. As a result, measurements for the parameters are restricted to the tread of the tire. These measurements do not provide information about other portions of the tire.

Second, the geometry of the sensors used in existing systems do not allow for accurate measurements of forces affecting the whole tire (i.e., the sensors only measure forces affecting one or two localized areas of the tire). For example, the sensors are large in size and occupy up a large volume of space inside the tire. As a result, it is impossible to embed a sufficient number of sensors in the tire to allow for accurate measurement of forces affecting the whole tire. Embedding a sufficient number of these sensors would degrade the performance of the tire and possibly result in a safety risk to passengers of the automobile.

Third, the sensors used in the existing systems require a large amount of power when a sufficient number of sensors are used. Existing systems do not have an adequate power supply to support powering the number of sensors that would be required to yield accurate measurements of parameters for the whole tire.

Fourth, because a very limited number of sensors are embedded in the tire, only a few parameters of the tire are measured. The measurements yielded from these systems have low spatial resolution and low accuracy due to the above-described deficiencies in the sensors.

SUMMARY OF THE INVENTION

The present invention overcomes the deficiencies and shortcomings of the prior art by providing a system and method for measuring physical parameters of a tire. The system of the present invention is particularly advantageous because it utilizes a sensor layer that allows the physical parameters of the tire to be continuously measured over the tread, shoulder and a portion of a sidewall of the tire. In one embodiment, the system of the present invention comprises the sensor layer and a circuit layer. The sensor layer is communicatively coupled to the circuit layer. The sensor layer is configured as a first thin film and embedded in the tire. In one embodiment, the sensor layer is embedded in one or more of: a tread layer; a location between a tread layer and a belt; a shoulder; and a portion of a sidewall of the tire. The sensor layer provides a signal related to a physical parameter of the tire. The circuit layer is configured as a second thin film and embedded in the tire. For, the circuit layer is superposed on the sensor layer (or vice versa) so that the perimeters of the circuit layer and the sensor layer at least substantially coincide. The circuit layer processes the signal(s) provided by the sensor layer.

BRIEF DESCRIPTION OF THE DRAWINGS

The accompanying drawings illustrate several embodiments of the invention and, together with the description, serve to explain the principles of the invention. The invention is illustrated by way of example, and not by way of limitation in the figures of the accompanying drawings in which like reference numerals are used to refer to similar elements.

FIGS. 1A-1D are block diagrams illustrating a tire system according to various embodiments of the present invention.

DETAILED DESCRIPTION OF THE PREFERRED EMBODIMENTS

Figure 1A:
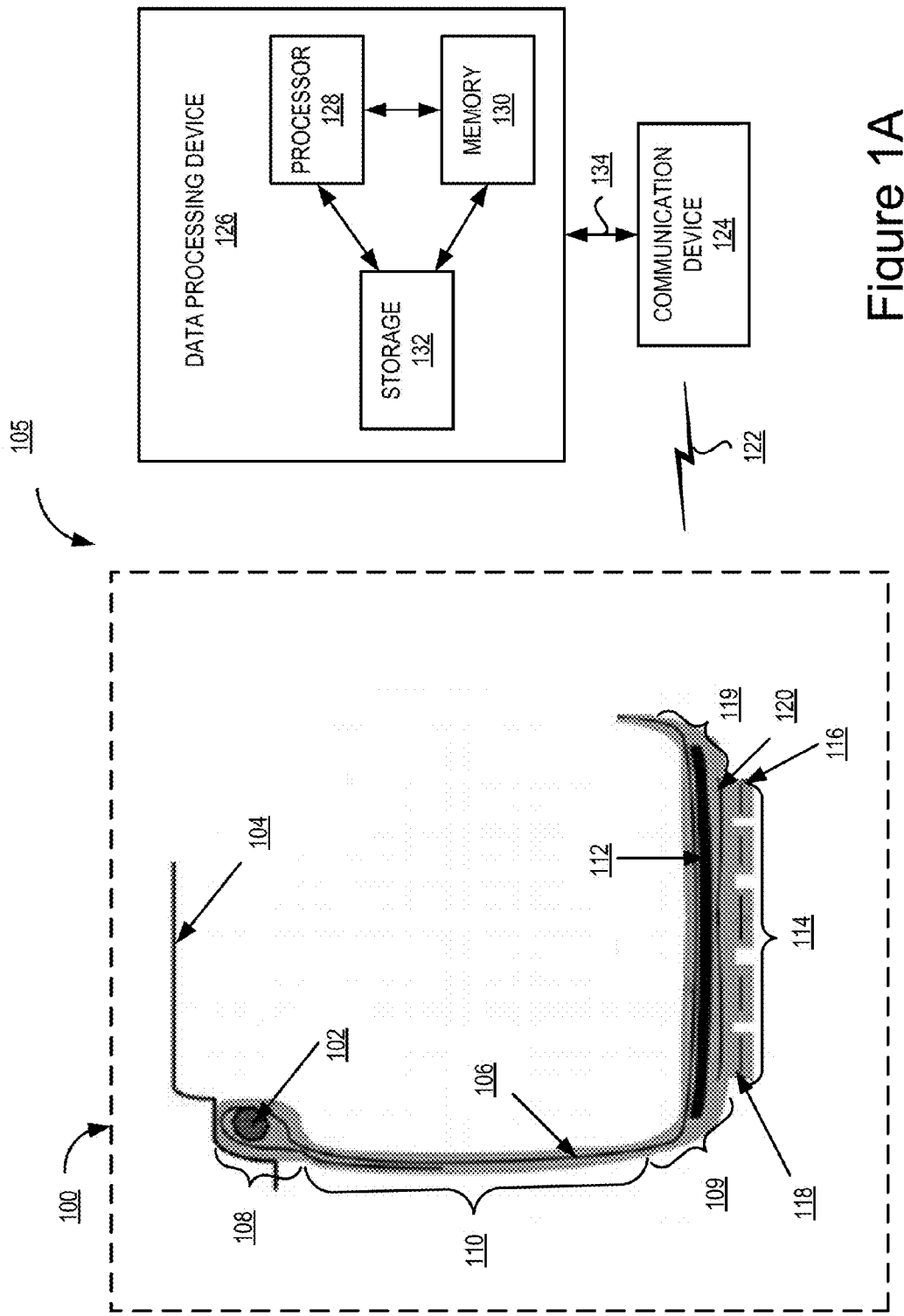

A system and method for measuring physical parameters of a tire is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a non-transitory computer-readable memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, a flash memory, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Monitoring physical parameters of a tire 100 such as a conventional automobile tire is desirable because it provides information about the performance of the tire. The embodiments described herein provide a system and method for measuring physical parameters of the tire 100 so that accurate measurements of forces affecting the whole tire 100 can be recorded.

FIG. 1A is a diagram illustrating a tire system 105 according to one embodiment of the present invention. The tire system 105 is configured to measure a variety of physical parameters affecting a tire 100. Examples of the physical parameters measured by the tire system 105 include, but are not limited to: centrifugal force; acceleration; inner pressure; ground contact pressure; temperature; sidewall flex; stress; and strain. In the illustrated embodiment, the tire system 105 includes a tire 100, a communication device 124 and a data processing device 126. The tire 100 is depicted in FIG. 1A using a cross-sectional view. The tire 100 is communicatively coupled to the communication device 124 via a wireless channel 122 and the communication device 124 is communicatively coupled to the data processing device 126 via signal line 134. For example, the tire 100 transmits a signal related to a physical parameter of the tire 100 to the communication device 124 via the wireless channel 122, and then the communication device 124 relays the signal to the data processing device 126 via the signal line 134. In one embodiment, the wireless channel 122 is a wireless connection such as a wireless Personal Area Network (PAN) or a wireless Local Area Network (LAN). The signal line 134 is a wired or wireless connection such as a PAN or a LAN. Persons having ordinary skills in the art will recognize that in other embodiments the wireless channel 122 and the signal line 134 can be any combination of a PAN and/or LAN. In one embodiment, communications via the wireless channel 122 and the signal line 134 are bidirectional.

The tire 100 is a cylinder with U-shaped walls capable of rotating on its axis (not pictured). For example, the tire 100 is an automobile tire configured according to the present invention. The tire 100 is mounted on a rim 104 to provide cushion for a wheel and improve vehicle performance. In one embodiment, the tire 100 facilitates movement or transportation while supporting a load (mass), or performs labor in machines. Further examples of the tire 100 include, but are not limited to: a solid tire; a pneumatic tire; a semi-pneumatic tire; and an airless tire. In each of these examples, the tire 100 is configured according to the present invention.

In the illustrated embodiment, the tire 100 includes: a wire 102; a casing 106; a first shoulder 108; a second shoulder 109; a third shoulder 119; a sidewall 110; a belt 112; a tread 114; a tread layer 116; a sensor layer 118; and a circuit layer 120.

The wire 102 is a ring-shaped strand of wire disposed in the first shoulder 108 of the tire 100 that couples the tire 100 to the rim 104. For example, the wire 102 is a strand of steel wire that holds the tire 100 on the rim 104. In one embodiment, the wire 102 is coated with special alloys such as bronze or brass.

The casing 106 is a U-shaped layer embedded within the U-shaped walls of the tire 100. The casing 106 goes round the wire 102, traverses through the first shoulder 108, the sidewall 110, the second shoulder 109, the tread 114 and the third shoulder 119 and extends to a second wire (not pictured) symmetric to the wire 102. The casing 106 acts as a framework for the tire 100. For example, the casing 106 is a layer of fabric or any other moldable material. In one embodiment, the casing 106 absorbs shocks and supports air pressure and vertical load.

The first shoulder 108 is an inner edge of the tire 100 that contacts the rim 104. The first shoulder 108 extends outwardly from the wire 102. The first shoulder 108 is traversed through by the casing 106. For example, the first shoulder 108 is formed from steel wires and high-strength, low-flexibility rubber that holds the tire 100 to the rim 104. In one embodiment, the first shoulder 108 is configured to eliminate shift of the tire 100 from the rim 104 when the tire 100 rotates.

The second shoulder 109 is an arch-shaped outer edge of the tread 114 that transitions from the tread 114 to the sidewall 110. The second shoulder 109 is extended outwardly from the casing 106 between the tread 114 and the sidewall 110. For example, the second shoulder 109 is a conventional shoulder such as found on a conventional tire of an automobile.

The third shoulder 119 is an arch-shaped outer edge of the tread 114 that transitions from the tread 114 to a second sidewall (not pictured). The third shoulder 119 is extended outwardly from the casing 106 between the tread 114 and the second sidewall (not pictured).

The sidewall 110 is an I-shaped portion of the tire 100 between the first shoulder 108 and the second shoulder 109. The sidewall 110 extends outwardly from the casing 106. For example, the sidewall 110 is a conventional sidewall such as found on the tire of an automobile. In one embodiment, the sidewall 110 is adapted to provide abrasion resistance and/or environmental resistance. For example, the sidewall 110 is ribbed or treaded. In one embodiment, the sidewall 110 is reinforced with fabric or cords that provide additional strength or flexibility. In one embodiment, the cords are made out of steel.

The tread 114 is a base portion of the U-shaped walls of the tire 100 that contacts road surface. The tread 114 is traversed through by the casing 106. In one embodiment, the tread 114 is a grooved or patterned exterior part of the tire that provides traction for the tire 100. For example, the tread 114 is a conventional tread found on an automobile tire. In one embodiment, the tread 114 is formed from an elastic material to provide traction for the tire 100 and a load being transported by the tire 100 (e.g., an automobile). For example, the tread 114 is made out of rubber or rubber composite compound.

The tread layer 116 is an outer surface of the tread 114 that contacts the road surface. The tread layer 116 extends outwardly from the casing 106. For example, the tread layer 116 is a conventional contact patch on an automobile tire. In one embodiment, the tread layer 116 is made out of an elastic material. For example, the tread layer 116 is made out of rubber or rubber composite compound.

The belt 112 is a cord layer embedded in the base of the U-shaped walls of the tire 100. The belt 112 extends outwardly of the casing 106. The belt 112 is disposed between the tread layer 116 and the casing 106. The belt 112 absorbs all or part of the forces that result from rotating the tire 100 on the axis of the tire 100 (not pictured). For example, the belt 112 reduces shocks and protects the tread 114 from being worn so that the casing 106 is exposed to the outside of the tire 100. In one embodiment, the belt 112 consists of one or more of: a layer of rubber; a layer of steel cords; and a second layer of rubber.

The sensor layer 118 is a first thin film layer comprised within the tire 100. One or more sensors are embedded in the first thin film layer. In one embodiment, the sensors that are comprised within the first thin film layer are one or more organic or monolithic silicon thin-film transistors and/or diodes. In one embodiment, the sensor layer 118 comprises Micro-Electro-Mechanical Systems (MEMS) and/or semiconductor components. In another embodiment, the sensor layer 118 comprises one or more organic or monolithic silicon thin-film transistors and/or diodes as well as MEMS and/or semiconductor components.

In one embodiment, the sensor layer 118 is in the range of thickness from a nanometer scale to a micrometer scale. For example, the sensor layer 118 has a range of thickness from one hundred nanometers (100 nanometers) to one thousand micrometers (1,000 micrometers). In one embodiment, the sensor layer 118 has a range of thickness in a nanometer scale from one nanometer (1 nanometer) to nine hundred and ninety-nine nanometers (999 nanometers). In another embodiment, the sensor layer 118 has a range of thickness in a micrometer scale from one micrometer (1 micrometer) to one thousand micrometers (1000 micrometers).

The sensor layer 118 is communicatively coupled to the circuit layer 120. In one embodiment, the communication between the sensor layer 118 and the circuit layer 120 is bidirectional. For example, the sensor layer 118 generates and transmits a signal related to a physical parameter of the tire 100 to the circuit layer 120. The sensor layer 118 receives a control signal from the circuit layer 120. In one embodiment, the control signal is generated by the circuit layer 120. In another embodiment, the communication between the sensor layer 118 and the circuit layer 120 is a wired or wireless communication. For example, the communication between the sensor layer 118 and the circuit layer 120 is a wireless PAN connection such as Bluetooth and/or a LAN connection.

As described above, the sensor layer 118 is configured to provide a signal including data and/or information describing a physical parameter of the tire 100 to the circuit layer 120. This signal is referred to herein as "the parameter signal." In one embodiment, the sensor layer 118 generates the parameter signal using one or more sensors of the sensor layer 118, and then transmits the parameter signal to the circuit layer 120.

In one embodiment, the sensor layer 118 is disposed in the tire 100 so that the sensor layer 118 measures physical parameters affecting the whole tire. In another embodiment, the sensor layer 118 is disposed in the tire 100 so that sensor layer 118 measures physical parameters affecting 70 to 100 percent of the tire. The sensor layer 118 is described in further detail with reference to FIGS. 3A-3B.

The circuit layer 120 is a second thin film layer comprised within the tire 100. The circuit layer 120 comprises one or more circuits embedded in the second thin film layer. In one embodiment, the one or more circuits that are comprised within the circuit layer 120 are one or more organic or monolithic silicon thin-film transistors and/or diodes. In one embodiment, the circuit layer 120 comprises (1) one or more microelectromechanical systems ("MEMS") and/or (2) one or more semiconductor components. In another embodiment, the circuit layer 120 comprises one or more of the following: (1) one or more organic, amorphous oxide or amorphous or nanocrystalline silicon thin-film transistors; (2) one or more or monolithic thin-film transistors; (3) one or more diodes; (4) one or more MEMS; and (5) one or more semiconductor components.

The circuit layer 120 is in the range of thickness from a sub-nanometer scale to a micrometer scale. For example, the circuit layer 120 has a range of thickness from one hundred nanometers (100 nanometers) to one thousand micrometers (1,000 micrometers). In one embodiment, the circuit layer 120 has a range of thickness in a nanometer scale from one nanometer (1 nanometer) to nine hundred and ninety-nine nanometers (999 nanometers). In another embodiment, the circuit layer 120 has a range of thickness in a micrometer scale from one micrometer (1 micrometer) to one thousand micrometers (1000 micrometers).

The circuit layer 120 is communicatively coupled to the sensor layer 118. For example, the circuit layer 120 receives the parameter signal from the sensor layer 118. The circuit layer 120 is also communicatively coupled to the communication device 124 via the wireless channel 122. For example, the circuit layer 120 processes the parameter signal received from the sensor layer 118, generates a corresponding output signal and then transmits the output signal to the communication device 124 via the wireless channel 122. In one embodiment, the wireless channel 122 is a wireless connection such as a wireless PAN or LAN connection. The circuit layer 120 is described in further detail with reference to FIGS. 4A-4D.

In the embodiment depicted in FIG. 1A, the sensor layer 118 is embedded in the tread layer 116 and the circuit layer 120 is embedded between the belt 112 and the tread layer 116. In other embodiments, the sensor layer 118 and the circuit layer 120 are embedded in different locations of the tire 100 such as the second shoulder 109, the sidewall 110 and/or the tread 114, etc. These embodiments are described in further detail with reference to FIGS. 1B-1D and FIGS. 2B-2D.

The above-described embodiment beneficially provides numerous advantages not present in existing systems. First, because the sensor layer 118 and the circuit layer 120 are configured as thin films, hundreds or thousands of sensors and circuits are embedded into the tire 100 as part of the sensor layer 118 and/or the circuit layer 120 without causing measurable performance degradation. For example, the sensor layer 118 embedded in the tire 100 includes one hundred (100) to one million (1,000,000) sensors and the circuit layer 120 embedded in the tire includes one hundred (100) to one million (1,000,000) transistors.

In one embodiment, the sensor layer 118 and the circuit layer 120 are adapted to continuously measure a variety of parameters over one or more of the tread 114, the second shoulder 109 and the sidewall 110. Although only one sensor layer 118 and one circuit layer 120 are depicted in the embodiment shown in FIG. 1A, one skilled in the art will recognize that in other embodiments two or more sensor layers 118 and two or more circuit layers 120 are embedded in the tire 100. For example, the sensor layers 118 are fabricated through a series of processing such as deposition, lamination and printing, and then embedded in the tire 100. The sensor layers 118 comprise one or more layers of: an elastomer layer; a printed electrode; a polyvinylidene fluoride-trifluoroethylene (PVDF-TrFE) layer; a sensor foil; a spacer foil; and a substrate. In one embodiment, the sensor layers 118 are communicatively coupled to the circuit layers 120 via wired or wireless connections. For example, each of the sensor layers 118 and the circuit layers 120 comprises an antenna (see, e.g., element 316 of FIGS. 3A and 3B, or element 404 of FIGS. 4A-4D) so that each sensor layer 118 is configured to communicate with a circuit layer 120 via a wireless communication channel (e.g., a wireless channel such as signal line 303 shown in FIGS. 3A and 3B). In one embodiment, the antenna is a micro spiral coil. In other embodiments, the sensor layers 118 and the circuit layers 120 each comprise a transceiver (see, e.g., element 314 of FIGS. 3A and 3B, or element 402 of FIGS. 4A-4D) and are configured to communicate with one another using the transceivers. One skilled in the art will recognize that a communication protocol between the sensor layers 118 and the circuit layers 120 can be established to implement the techniques described herein.

The communication device 124 is any device that relays signals from one device to another device. For example, the communication device 124 is a transceiver that uses the same circuits to transmit and receive signals. In one embodiment, the communication device 124 receives the parameter signal from the tire 100 and relays the parameter signal to the data processing device 126. In one embodiment, the communication device 124 communicates with the tire 100 or the data processing device 126 via a wired or wireless connection. In one embodiment, a plurality of communication devices 124 are used in the system 105 to relay one or more parameter signals between the tire 100 and the data processing device 126. In another embodiment, the communication device 124 is comprised within the data processing device 126. For example, the communication device 124 is an interface of the data processing device 126 that communicates with the tire 100.

In one embodiment, the communication device 124 is disposed in a fixed location adjacent to the tire 110. For example, the communication device 124 is disposed in a wheel or near a wheel of a vehicle. In another embodiment, the communication device 124 is mounted on a vehicle. For example, the communication device 124 is disposed inside an automobile.

The data processing device 126 is any device that is adapted to process data. For example, the data processing device 126 is one of a general purpose computer, an electronic control unit, an on-board diagnostics unit, a microprocessor, or any other known processor-based electronic device capable of processing data. In the illustrated embodiment, the data processing device 126 includes a processor 128, a memory 130 and a storage device 132. In one embodiment, the processor 128, the memory 130 and the storage 132 are communicatively coupled to one another. For example, the processor 128, the memory 130 and the storage 132 are communicatively coupled to a system bus such as a peripheral bus.

The processor 128 processes data signals and comprises various computing architectures including a Complex Instruction Set Computer ("CISC") architecture, a Reduced Instruction Set Computer ("RISC") architecture, or an architecture implementing a combination of instruction sets. Although only a single processor is shown in FIG. 1A, in one embodiment one or more processors are comprised within the data processing unit 126.

The memory 130 is a non-transitory computer-readable memory that stores computer code and routines executable by the processor 128 for performing signal processing as described herein.

The storage 132 is a non-transitory computer-readable memory that stores instructions and/or data executable by the processor 128. In one embodiment, the storage 132 stores data describing the parameters of the tire 100 as determined by the processor 128 executing the code and routines stored on the memory 130 to process the parameter signal received from the communication device 124 via the signal line 134. In one embodiment, the signal line 134 is a wireless connection such as a wireless PAN or LAN connection.

Figure 1B:
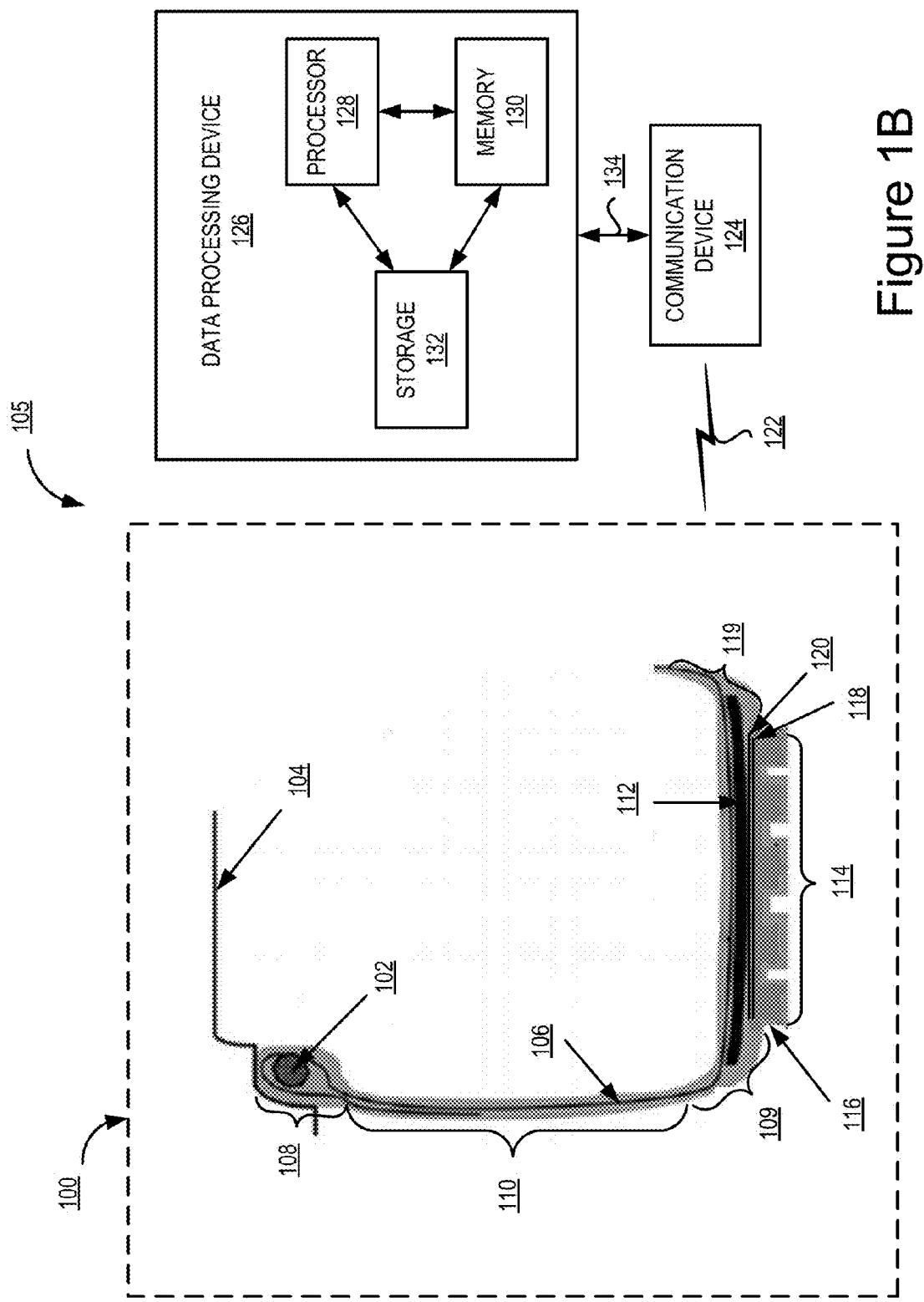
Figure 1D:
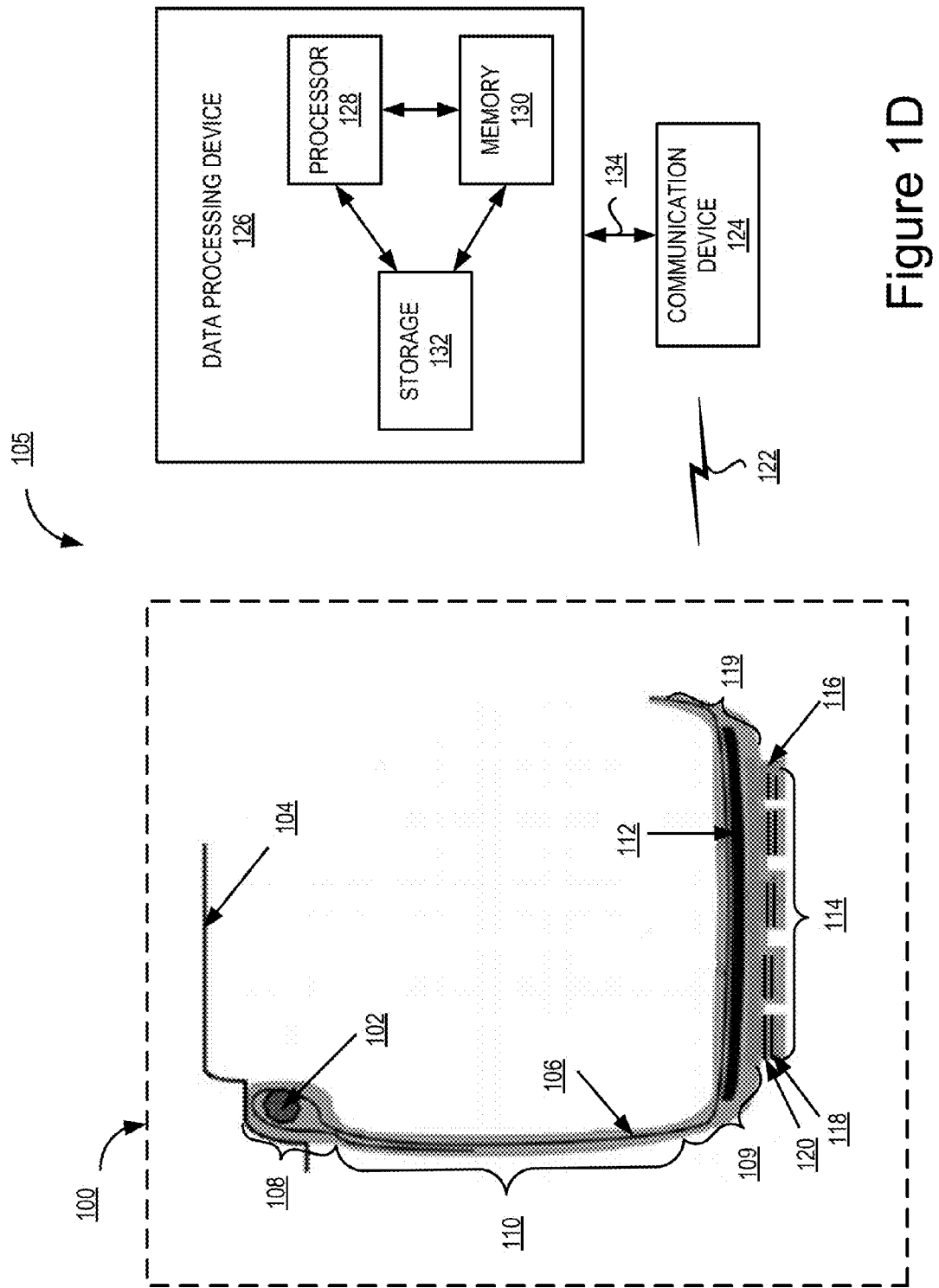

FIGS. 1B-1D are diagrams illustrating the tire system 105 according to various different embodiments of the present invention. The elements in FIGS. 1B-1D work similar to the elements described above in FIG. 1A, and so, these descriptions will not be repeated here. Similar elements have similar reference numerals. The differences between FIG. 1A and FIGS. 1B-1D are described below.

In the embodiment depicted in FIG. 1B, the sensor layer 118 is disposed beneath the belt 112. The sensor layer 118 is embedded between the belt 112 and the tread layer 116. The circuit layer 120 is disposed in parallel with the sensor layer 118. In one embodiment, the circuit layer 120 is superposed on the sensor layer 118. For example, the circuit layer 120 is placed atop of the sensor layer 118. The circuit layer 120 is communicatively coupled to the sensor layer 118 via electrical wiring (see, e.g., signal line 502 of FIGS. 5A-5B). In another embodiment, the circuit layer 120 is embedded between the belt 112 and the sensor layer 118. The circuit layer 120 is communicatively coupled to the sensor layer 118 via a wireless channel such as a PAN or LAN.

In the embodiment depicted in FIG. 1C, the sensor layer 118 is disposed beneath the belt 112 and extended to the second shoulder 109 and a portion of the sidewall 110. The circuit layer 120 is disposed in parallel with the sensor layer 118. In one embodiment, the circuit layer 120 is superposed on the sensor layer 118. For example, the circuit layer 120 is placed atop of the sensor layer 118. The circuit layer 120 is communicatively coupled to the sensor layer 118 via electrical wiring. By utilizing a thin-film structure and extending the sensor layer 118 and the circuit layer 120 from the tread 114 to the second shoulder 109 as well as the sidewall 110, thereby allow the system 105 to measure the physical parameters (e.g., strain force, centrifugal force, etc.) of the tire 100 acting upon the tread 114, the second shoulder 109 and the sidewall 110.

In the embodiment depicted in FIG. 1D, the sensor layer 118 is embedded in the tread layer 116. The circuit layer 120 is disposed in parallel with the sensor layer 118. In one embodiment, the circuit layer 120 is superposed on the sensor layer 118. For example, the circuit layer 120 is placed atop of the sensor layer 118. The circuit layer 120 is communicatively coupled to the sensor layer 118 via electrical wiring.

Tread

Figure 2A:
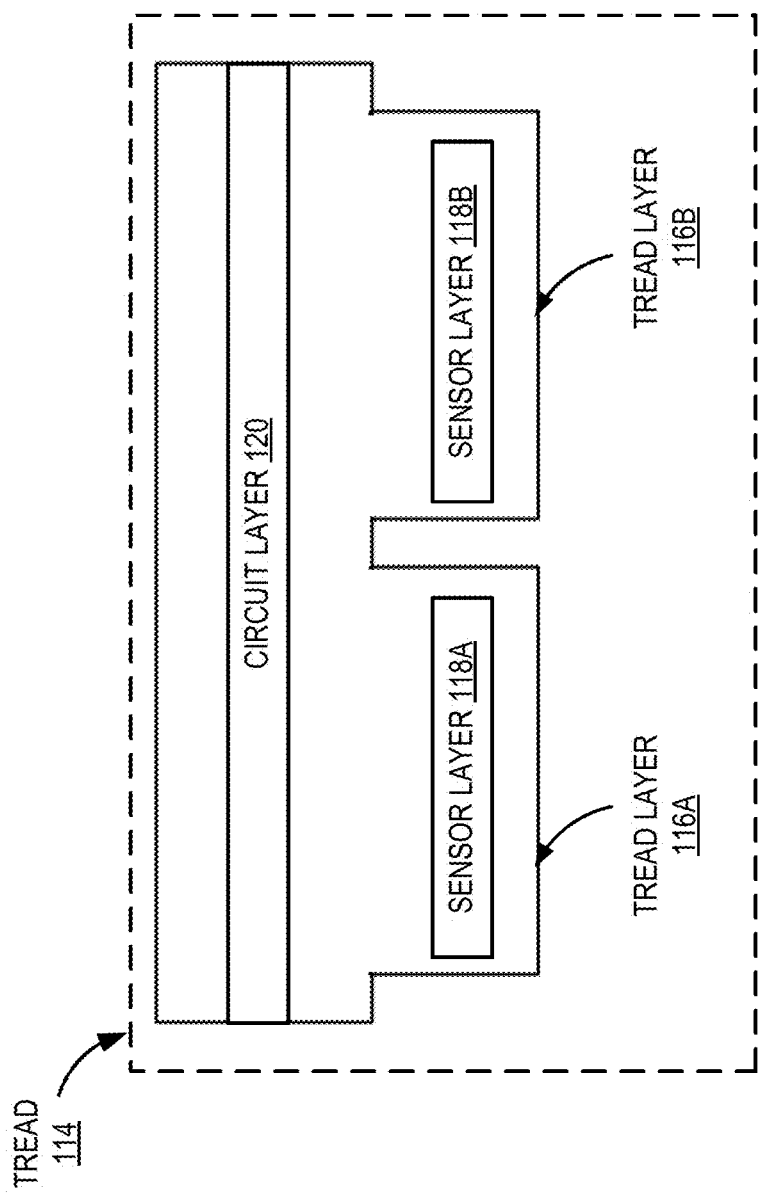
FIGS. 2A and 2B are diagrams illustrating a cross-sectional view of a portion of a tread that begins at a second shoulder of the tire and ends at a third shoulder of the tire according to various embodiments of the present invention.

FIG. 2A is a diagram illustrating a cross-sectional view of a portion of the tread 114 according to one embodiment of the present invention. In the illustrated embodiment, the tread 114 corresponds to the tire 100 shown in FIG. 1A. The sensor layers 118A and 118B are embedded in the tread layers 116A and 116B. The circuit layer 120 is disposed beneath the belt 112. In one embodiment, the circuit layer 120 is embedded between the belt 112 (not shown) and the tread layers 116A-116B. The circuit layer 120 is communicatively coupled to the sensor layer 118 via a wireless channel (see, e.g., signal line 303 in FIGS. 3A and 3B).

Figure 2B:
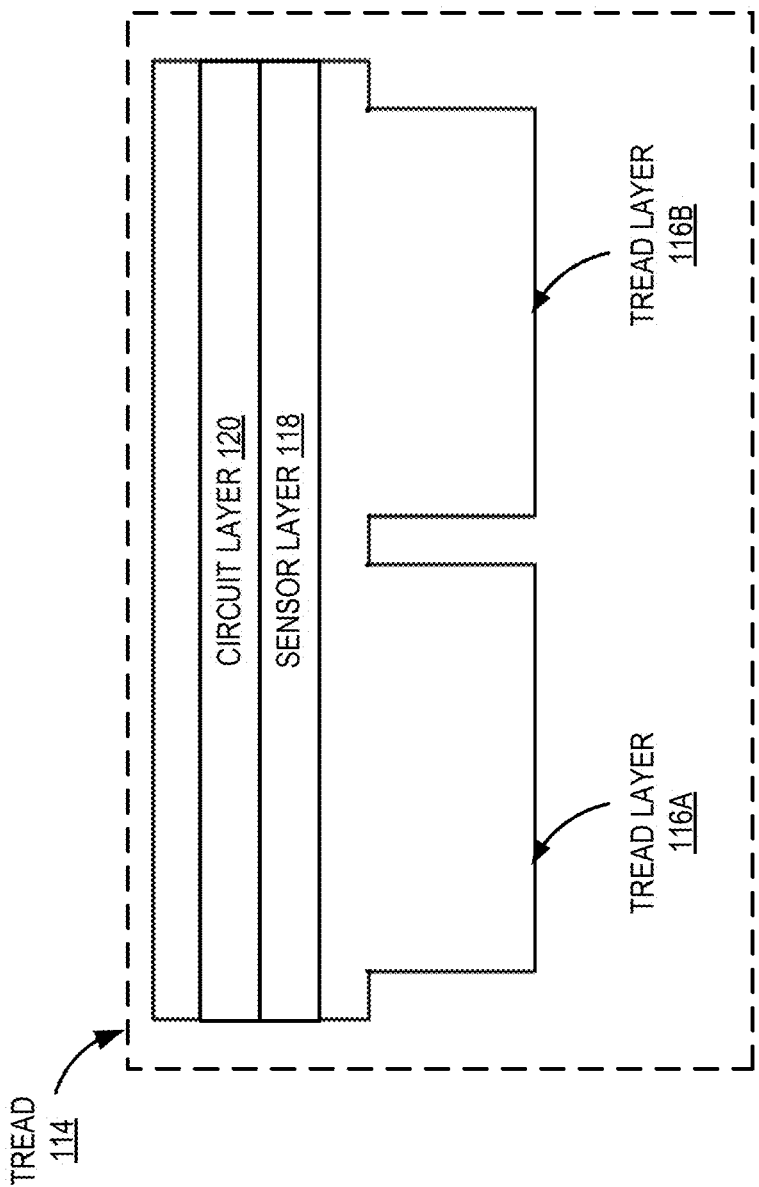
Figure 5A:
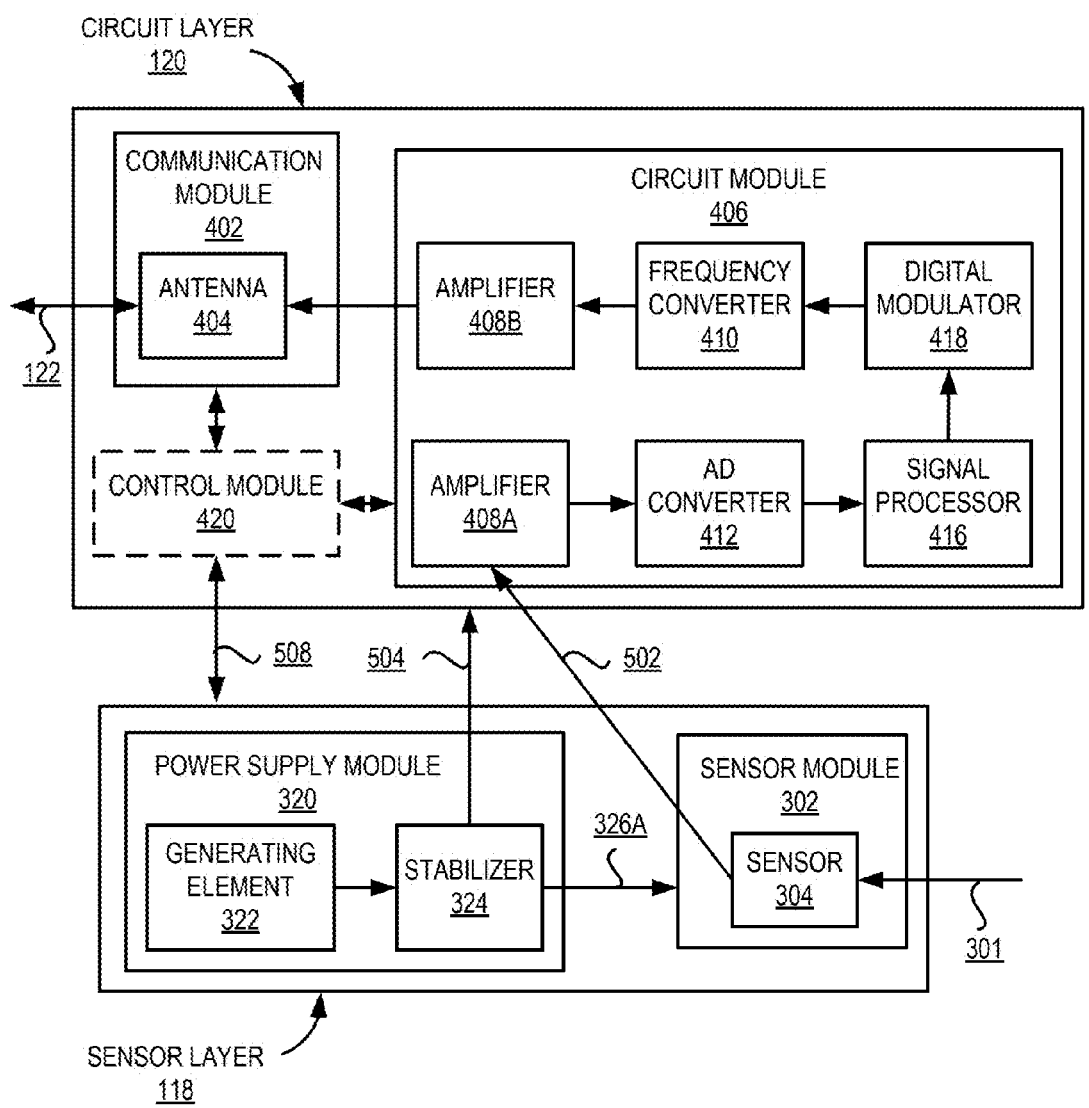
FIGS. 5A and 5B are block diagrams illustrating the circuit layer disposed on the sensor layer according to various embodiments of the present invention.
Figure 5B:
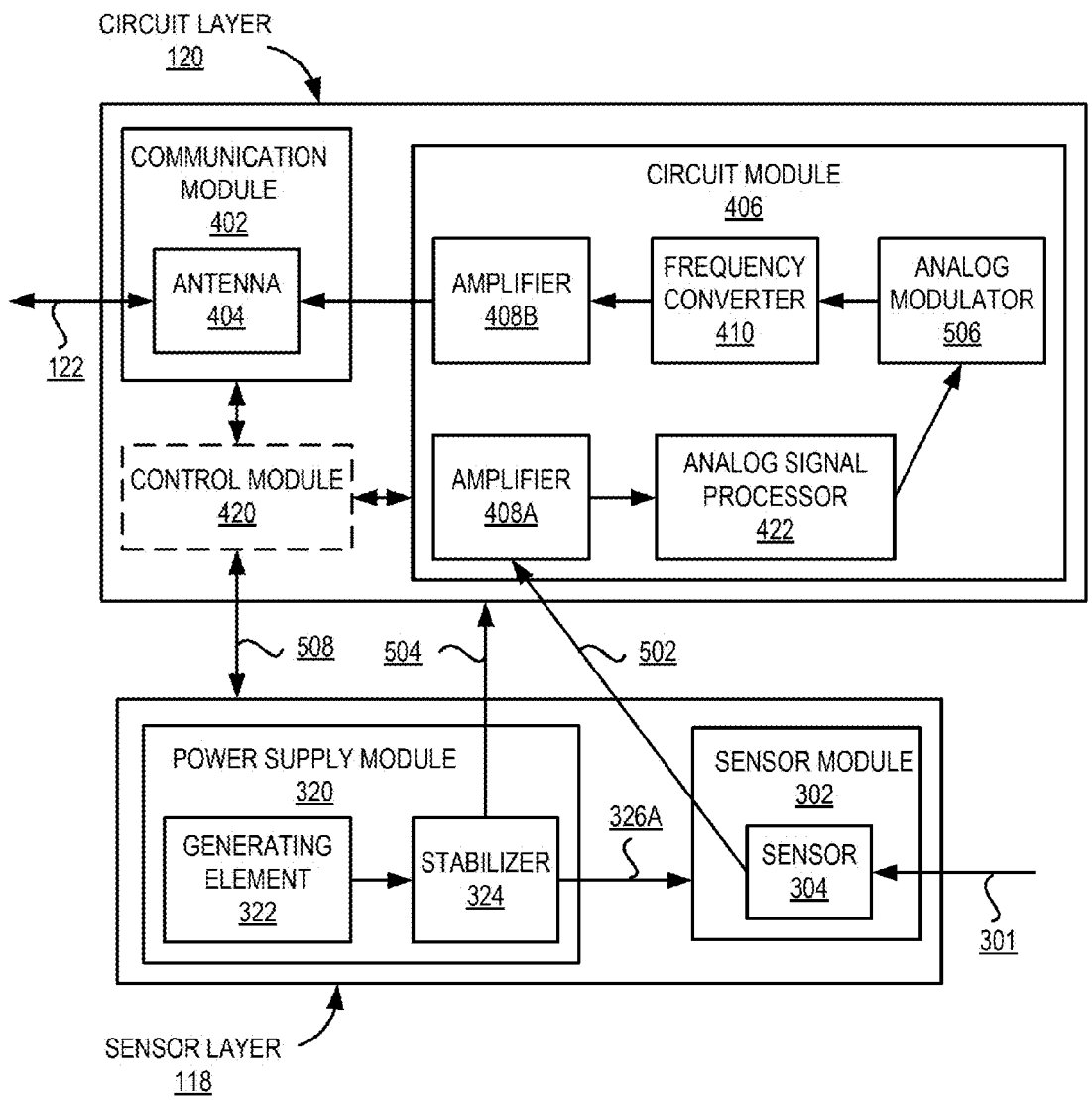

FIG. 2B is a diagram illustrating a cross-sectional view of a portion of the tread 114 according to one embodiment of the present invention. In the illustrated embodiment, the tread 114 corresponds to the tire 100 shown in FIG. 1B. In the illustrated embodiment, both the sensor layer 118 and the circuit layer 120 are embedded between the belt 112 (not shown) and the tread layers 116A-116B. In one embodiment, the circuit layer 120 is disposed on the sensor layer 118. For example, the circuit layer 120 is placed atop of the sensor layer 118. In one embodiment, the circuit layer 120 is communicatively coupled to the sensor layer 118 via electrical wiring (see, e.g., the signal line 502 as shown in FIGS. 5A and 5B).

Figure 2C:
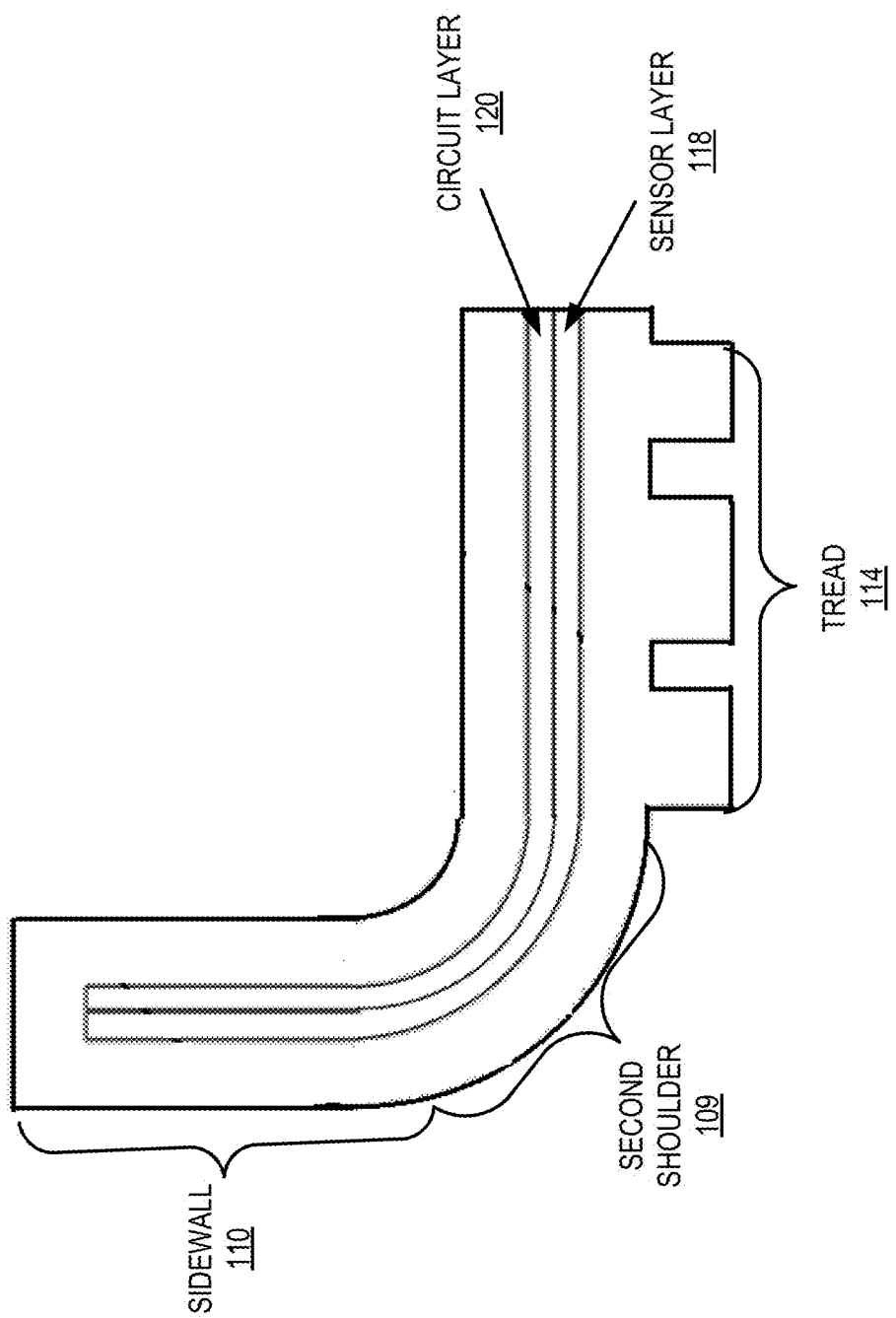
FIG. 2C is a diagram illustrating a cross-sectional view of a portion of a sidewall, a shoulder and the tread according to one embodiment of the present invention.

FIG. 2C is a diagram illustrating a cross-sectional view of a portion of the sidewall 110, the second shoulder 109 and the tread 114 according to one embodiment of the present invention. In the illustrated embodiment, the portion of the sidewall 110, the second shoulder 109 and the tread 114 correspond to the tire 100 shown in FIG. 1C. In the illustrated embodiment, the sensor layer 118 and the circuit layer 120 are extended from the tread 114 to the second shoulder 109 and the sidewall 110. In one embodiment, the circuit layer 120 is disposed on the sensor layer 118. For example, the circuit layer 120 is placed atop of the sensor layer 118. In one embodiment, the circuit layer 120 is communicatively coupled to the sensor layer 118 via electrical wiring.

Figure 2D:
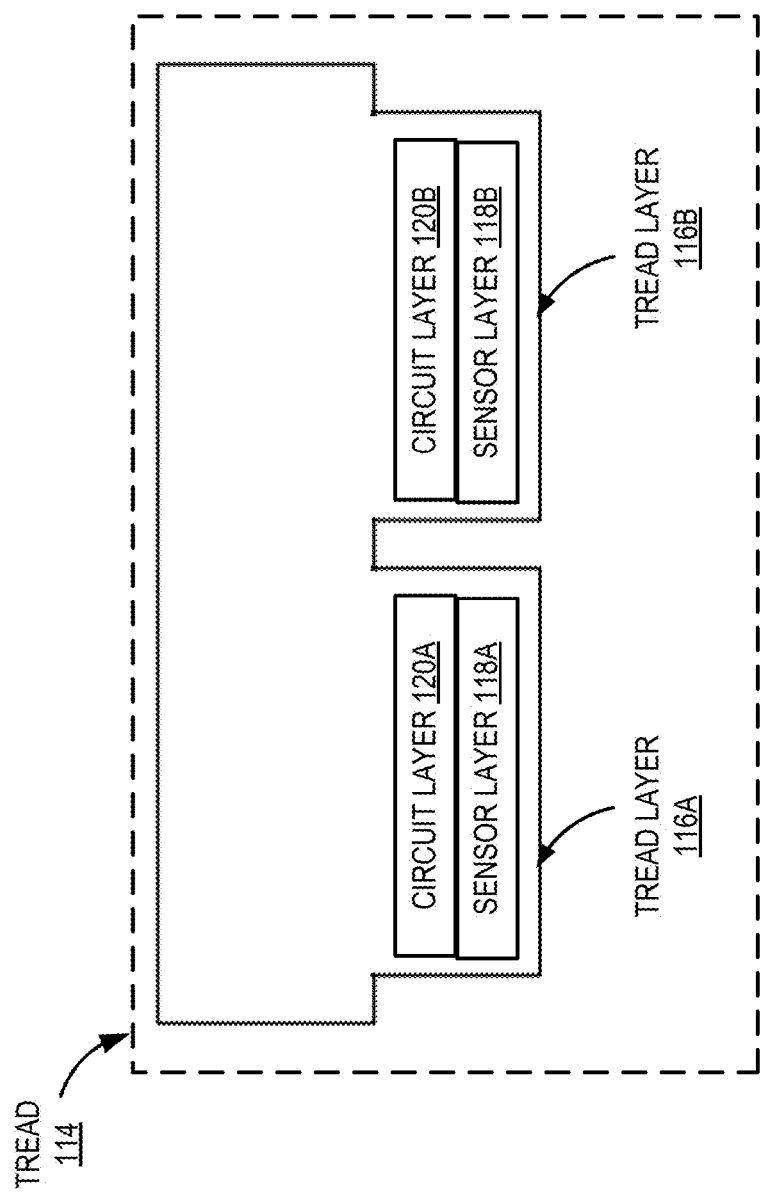
FIG. 2D is a diagram illustrating a cross-sectional view of a portion of the tread that begins at a second shoulder of the tire and ends at a third shoulder of the tire according to one embodiment of the present invention.

FIG. 2D is a diagram illustrating a cross-sectional view of a portion of the tread 114 according to another embodiment of the present invention. In the illustrated embodiment, the tread 114 corresponds to the tire 100 shown in FIG. 1D. In the illustrated embodiment, the sensor layers 118A, 118B and the circuit layers 120A-120B are embedded in the tread 114. For example, the sensor layer 118A and the circuit layer 120A are embedded in the tread layer 116A, and the sensor layer 118B and the circuit layer 120B are embedded in the tread layer 116B. In one embodiment, the circuit layer 120A is disposed on the sensor layer 118A, and the circuit layer 120B is disposed on the sensor layer 118B. For example, the circuit layer 120A is placed atop of the sensor layers 118A, and the circuit layer 120B is placed atop of the sensor layer 118B. In one embodiment, the circuit layer 120 is communicatively coupled to the sensor layer 118 via electrical wiring.

Sensor Layer and Circuit Layer

Figure 3A:
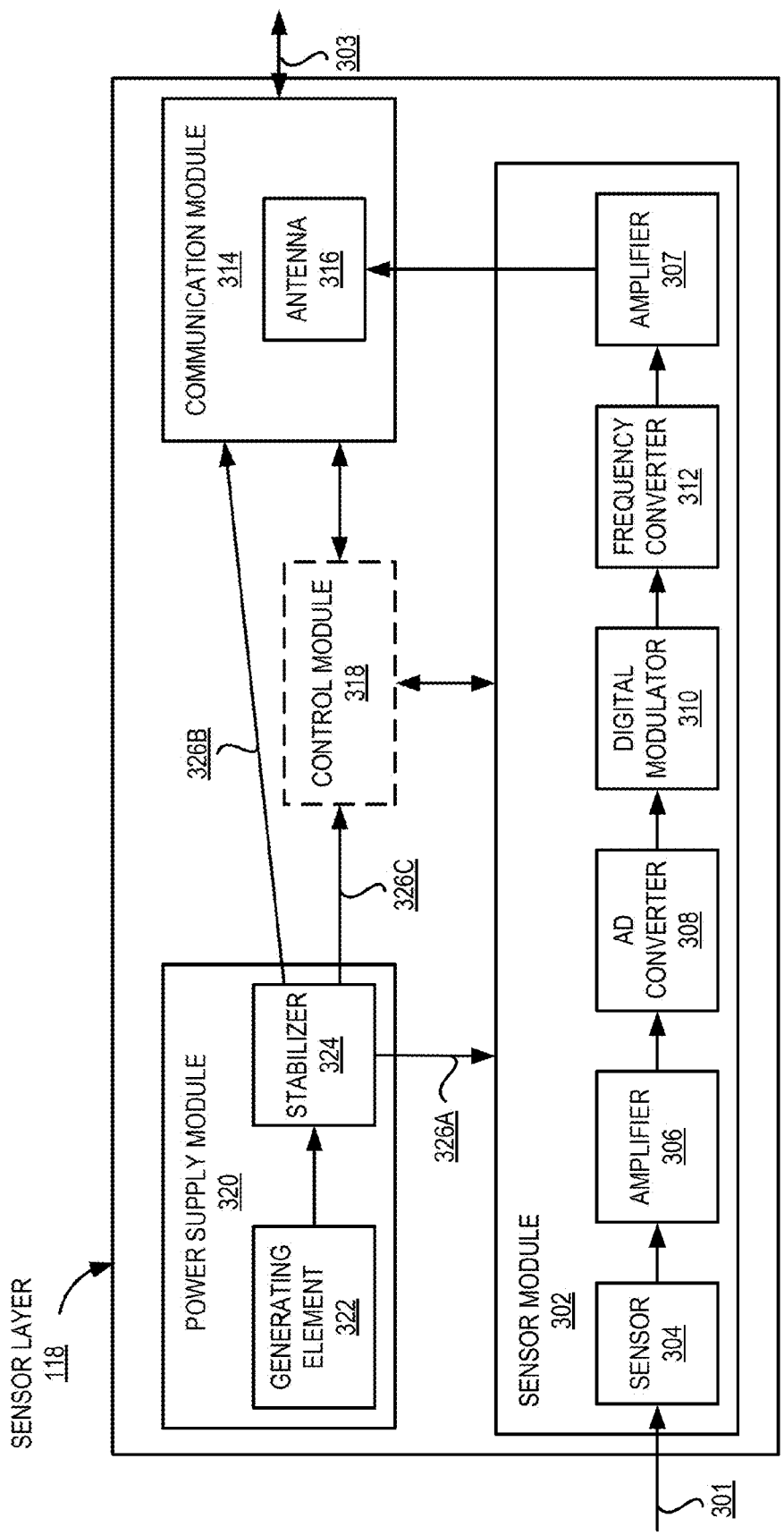
FIGS. 3A and 3B are block diagrams illustrating a sensor layer according to various embodiments of the present invention.

FIG. 3A is a block diagram illustrating the sensor layer 118 according to one embodiment of the present invention. The sensor layer 118 is communicatively coupled to the circuit layer 120 via signal line 303. For example, the signal line 303 is connected to the circuit layer 120 depicted in FIGS. 4A-4D. In one embodiment, the signal line 303 is a wired connection. In another embodiment, the signal line 303 is a wireless connection. For example, the signal line 303 is a PAN connection such as Bluetooth and/or a LAN connection. In one embodiment, the sensor layer 118 is configured to measure a force or temperature of the tire 100. A sensor comprised within the sensor layer 118 detects the force or temperature of the tire 100 (represented as an input 301 to the sensor) and outputs a signal related to the force or temperature. For example, a pressure-sensitive sensor detects a strain force acting on the tire 100 and adjusts the current flowing through the sensor according to the strain force. A person having ordinary skill in the art will recognize that the physical parameters measured by the sensor layer 118 include one or more of: temperature; stress; pressure; centrifugal force; etc. In one embodiment, the sensor layer 118 is configured to provide a parameter signal of the tire 100 to the circuit layer 120 via the signal line 303. For example, the sensor layer generates a parameter signal of the tire 100 and transmits the signal to the circuit layer 120 via the signal line 303.

In the illustrated embodiment, the sensor layer 118 includes a sensor module 302, a communication module 314, a control module 318 and a power supply module 320. Here, the control module 318 is depicted by a rectangle formed from a dashed line to indicate that it is an optional feature of the sensor layer 118. The sensor module 302, the communication module 314 and the control module 318 are communicatively coupled to each other. In one embodiment, the communications among the sensor module 302, the communication module 314 and the control module 318 are bidirectional. The power supply module 320 is also coupled to the sensor module 302, the communication module 314 and the control module 318 via power supply channels 326A-326C. For example, the power supply module 320 supplies power to the sensor module 302, the communication module 314 and the control module 318 via a first, second and third power supply channels 326A-326C. A power supply channel is a channel that delivers power. In one embodiment, the first, second and third power supply channels 326A, 326B, 326C are electrical wirings in the sensor layer 118.

The sensor module 302 is a device configured to receive the input 301, measure a physical parameter describing the input 301 and output the parameter signal describing the physical parameter. The parameter signal outputted by the sensor layer 118 quantifies the input 301. In the illustrated embodiment, the sensor module 302 includes a sensor 304, a first amplifier 306, a second amplifier 307, an analog-to-digital converter 308 ("AD converter 308"), a digital modulator 310 and a frequency converter 312. The sensor module 302 is communicatively coupled to the communication module 314 and the control module 318. For example, the sensor module 302 outputs the parameter signal to the communication module 314 and receives a control signal from the control module 318.

The sensor 304 is a device that measures the input 301 and converts the measurement into a signal. Examples of the sensor 304 include, but are not limited to: a pressure-sensitive sensor; a temperature-sensitive sensor; a sound-sensitive sensor; a force-sensitive sensor; and a light-sensitive sensor. In one embodiment, the sensor 304 comprises a thin-film transistor, a MEMS and/or semiconductor components (or any combination of two or more of these elements). For example, the sensor 304 is a pressure-sensitive sensor that comprises a thin-film transistor. In one embodiment, the thin-film transistor comprised within the pressure-sensitive sensor is made out of pressure-sensitive rubber or amorphous silicon.

Although only a single sensor 304 is shown in the sensor module 302, those skilled in the art will recognize that the sensor module 302 can include two or more sensors 304. In one embodiment, the two or more sensors 304 are the same type of sensors that measure a single physical parameter of the tire 100. For example, the two or more sensors 304 are pressure-sensitive sensors that measure the pressure of the tire 100 cooperatively. In another embodiment, the two or more sensors 304 are from different types of sensors and different physical parameters of the tire 100 are measured. For example, the two or more sensors 304 include one or more pressure-sensitive sensors and one or more temperature-sensitive sensors so that the pressure and the temperature of the tire 100 can be measured simultaneously.

The first amplifier 306 and the second amplifier 307 are any devices that amplify an input signal. Examples of the amplifiers 306 and 307 include, but are not limited to: a power amplifier; a vacuum tube amplifier; a transistor amplifier; an operational amplifier; a fully differential amplifier; and a microwave amplifier. In one embodiment, the first amplifier 306 and the second amplifiers 307 are of different types. For example, the first amplifier 306 is an operational amplifier and the second amplifier 307 is a power amplifier. In one embodiment, the first amplifier 30 and the second amplifier 307 are combined into a single amplifier 306. For example, a single amplifier 306 is applied to perform the functionalities of the amplifiers 306 and 307.

In the illustrated embodiment, the first amplifier 306 is adapted to amplify the signal received from the sensor 304 and output an amplified signal to the AD converter 308. In one embodiment, the first amplifier 306 is an analog amplifier. An analog amplifier is an amplifier that amplifies an analog signal.

In the illustrated embodiment, the second amplifier 307 amplifies the signal received from the frequency converter 312 and forwards the amplified signal to the communication module 314. In one embodiment, the second amplifier 307 is a power amplifier. A power amplifier is an amplifier that focuses on power efficiency during the amplification process. In another embodiment, the amplifier 307 is a high-frequency power amplifier.

The AD converter 308 is any device that converts an analog signal to a digital signal. For example, the AD converter 308 is an electronic device that converts an analog voltage or current to a digital number proportional to the magnitude of the voltage or current. In one embodiment, the AD converter 308 is an electronic circuit embedded in the thin-film sensor layer 118. The AD converter 308 is adapted to digitize an input analog signal from the amplifier 306 into a digital signal. The digital signal contains information about a physical parameter of the tire 100. The AD converter 308 then forwards the digital signal to the digital modulator 310.

The digital modulator 310 is any device that performs modulation of a digital signal. In one embodiment, the digital modulator 310 is an electronic device that varies one or more properties of a carrier signal with respect to a modulating signal. For example, the digital modulator 310 is an electronic circuit embedded in the sensor layer 118 that varies the amplitude of a carrier signal based on a modulating signal. In the illustrated embodiment, the modulating signal is the digital signal received from the AD converter 308, and a carrier signal is a periodic waveform such as a sinusoid waveform or a square wave pulse train, etc.

In one embodiment, the digital modulator 310 applies a digital baseband modulation or line codes to the input digital signal. For example, the digital modulator 310 modulates the digital signal using one of unipolar codes, Hamming codes, return-to-zero codes, non-return-to-zero codes, Manchester codes and/or alternate mark inversion codes, etc.

In another embodiment, the digital modulator 310 modulates the digital signal using digital modulation techniques. For example, the digital modulator 310 modulates the digital signal by applying one or more of phase-shift keying, frequency-shift keying, amplitude-shift keying, on-off keying, quadrature-amplitude modulation, continuous phase modulation, orthogonal frequency-division multiplexing modulation, wavelet modulation, trellis coded modulation and spread-spectrum techniques, etc.

The digital modulator 310 outputs a modulated signal to the frequency converter 312. The modulated signal contains information describing the physical parameter of the input 301 as measured by the sensor 304.

The frequency converter 312 is any device that performs frequency conversion of a signal. For example, the frequency converter 312 is an electronic device that converts a first signal with a first frequency to a second signal with a second frequency. In the illustrated embodiment, the frequency converter 312 converts the modulated signal received from the digital modulator 310 to a high-frequency signal. A high-frequency signal is a signal whose frequencies have been shifted from baseband to a high-frequency band, wherein the baseband is a frequency band measured from 0 Hz to the largest frequency of the signal before any frequency shifting, and the high-frequency band is any frequency band that has higher frequencies than the baseband. The converted high-frequency signal contains information describing the physical parameter of the input 301 as measured by the sensor 304, and is delivered to the amplifier 307.

As described above, the frequency converter 312 outputs the signal to the second amplifier 307 and the second amplifier 307 outputs the parameter signal to the communication module 314.

The communication module 314 is a device that transmits and receives signals. For example, the communication module 314 is a transceiver that transmits and receives signals with the same circuits. In the illustrated embodiment, the communication module is an interface through which the sensor layer 118 communicates with the circuit layer 120 via the signal line 303. The communication module 314 is communicatively coupled to the control module 318 and the sensor module 302. The communication module 314 receives the parameter signal from the sensor module 302 and communicates the parameter signal to the circuit layer 120 via the signal line 303. In one embodiment, the communication module 314 comprises an antenna 316.

The antenna 316 is any device that transmits and/or receives electromagnetic waves. For example, the antenna 316 is one of a spiral antenna, a dipole antenna, a patch antenna and/or a microstrip antenna, etc. In one embodiment, the antenna 316 is configured to receive the parameter signal from the sensor module 302 and transmit the parameter signal to the circuit layer 120 via the signal line 303. In another embodiment, the antenna 316 is also configured to act as a communication interface for exchanging control information between the control module 318 and the circuit layer 120.

Although only one antenna 316 is shown in FIG. 3A, one skilled in the art will recognize that two or more antennas 316 can be used in the communication module 314.

The control module 318 is a device that generates control signals. For example, the control module 318 is a microprocessor or a dedicated state machine sequencer that issues a series of control signals. In the illustrated embodiment, the control module 318 controls the sensor module 302 and the communication module 314. For example, the control module 318 generates a timing signal and uses the timing signal to synchronize the sensor module 302 and the communication module 314. In one embodiment, the control module 318 is communicatively coupled to the sensor module 302 and the communication module 314. For example, the control module 318 sends a control signal to the sensor module 302 and the communication module 314, and receives feedback information from the sensor module 302 and the communication module 314. In one embodiment, the control module 318 exchanges control information with the circuit layer 120 via the communication module 314.

The power supply module 320 is a device that provides power to other modules 302, 314, 318. For example, the power supply module 320 is a conventional power supply in the sensor layer 118. In the illustrated embodiment, the power supply module 320 includes a generating element 322 and a stabilizer 324. The power supply module 320 is coupled to the sensor module 302, the communication module 314 and the control module 318 via the power supply channels 326A-326C. In one embodiment, the power supply module 320 is configured to provide power to all the components of the sensor layer 118 so that no external power source is required.

The generating element 322 is a device that generates power. For example, the generating element 322 is a power generator that generates power by transforming energy of motion into electricity. In one embodiment, the generating element 322 generates power by means of vibration or contraction. In another embodiment, the generating element 322 generates power by converting temperature differences into power.

The stabilizer 324 is a device that maintains an output at a constant power level. In one embodiment, the stabilizer 324 is a voltage stabilizer that maintains a constant voltage output. For example, the stabilizer 324 is a direct current (DC) voltage stabilizer. The stabilizer 324 is adapted to supply constant power to each component of the sensor layer 118 via the power supply channels 326A-326C.

In one embodiment, the power supply module 320 is used to supply power to each component of the sensor layer 118 as shown in FIG. 3A. One skilled in the art will recognize that, in other embodiments, an external power source is applied to provide power to the sensor layer 118. For example, a minute battery supplies power to the sensor layer 118.

Figure 3B:
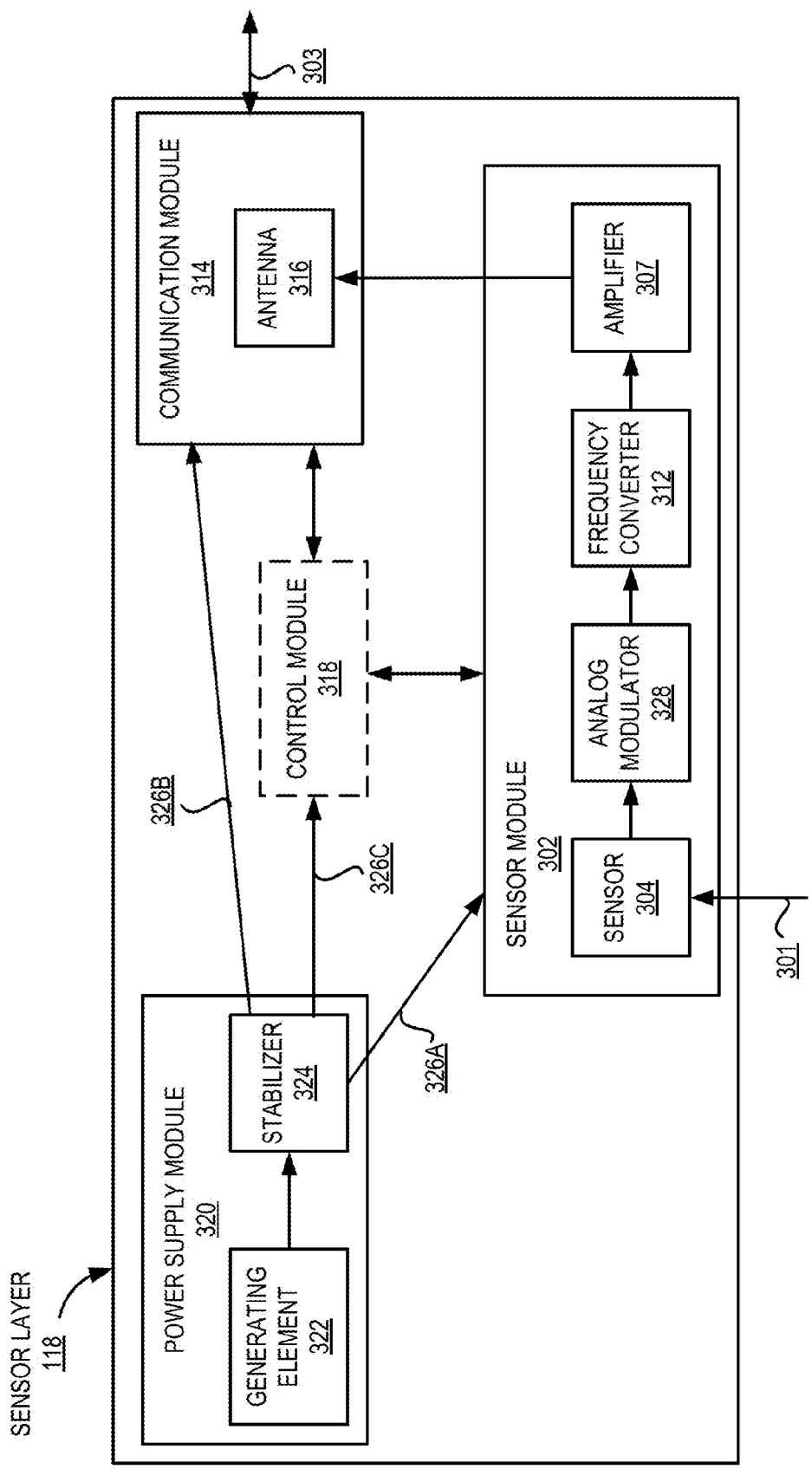

FIG. 3B is a block diagram illustrating another embodiment of the sensor layer 118 according to the present invention. The elements of FIG. 3B work similar to the elements of FIG. 3A described above, and so, these descriptions will not be repeated here. Similar elements have similar reference numerals. The differences between FIG. 3A and FIG. 3B are described below.

In the embodiment illustrated in FIG. 3B, the sensor module 302 includes a sensor 304, an analog modulator 328, a frequency converter 312 and an amplifier 307. Unlike the embodiment illustrated in FIG. 3A, the embodiment illustrated in FIG. 3B does not include an AD converter 308 and a first amplifier 306. In the depicted embodiment, the amplifier 307 performs the functions of either the first amplifier 306, the second amplifier 307 or both the first amplifier 306 and the second amplifier 307.

The analog modulator 328 is any device that performs modulation of an analog signal. For example, the analog modulator 328 is an electronic circuit that varies one or more properties of a carrier signal with respect to an analog signal. The carrier signal is a periodic waveform such as a sinusoid waveform or a square wave pulse train. In one embodiment, the analog modulator 328 modulates the analog signal by applying amplitude modulation such as double-sideband modulation, single-sideband modulation, vestigial sideband modulation and/or quadrature-amplitude modulation. In another embodiment, the analog modulator 328 modulates the analog signal by applying angle modulation such as frequency modulation and/or phase modulation.

Although the sensor layer 118 depicted in FIGS. 3A and 3B includes only one sensor module 302, one communication module 314, one control module 318 and one power supply module 320, those skilled in the art will recognize that, in other embodiments, the sensor layer 118 includes a plurality of these modules. For example, in one embodiment the sensor layer 118 includes two or more sensor modules 302, two or more communication modules 314, two or more control modules 318 and two or more power supply modules 320. In one embodiment, the plurality of these modules is adapted to measure different physical parameters of the tire 100. For example, in one embodiment, while a first sensor module 302, a first communication module 314, a first control module 318 and a first power supply module 320 are adapted to provide a first parameter signal related to the pressure of the tire 100, a second sensor module 302, a second communication module 314, a second control module 318 and a second power supply module 320 are adapted to provide a second parameter signal related to the temperature of the tire 100. In another embodiment, the plurality of modules is adapted to measure the same physical parameter of the tire 100.

Figure 4A:
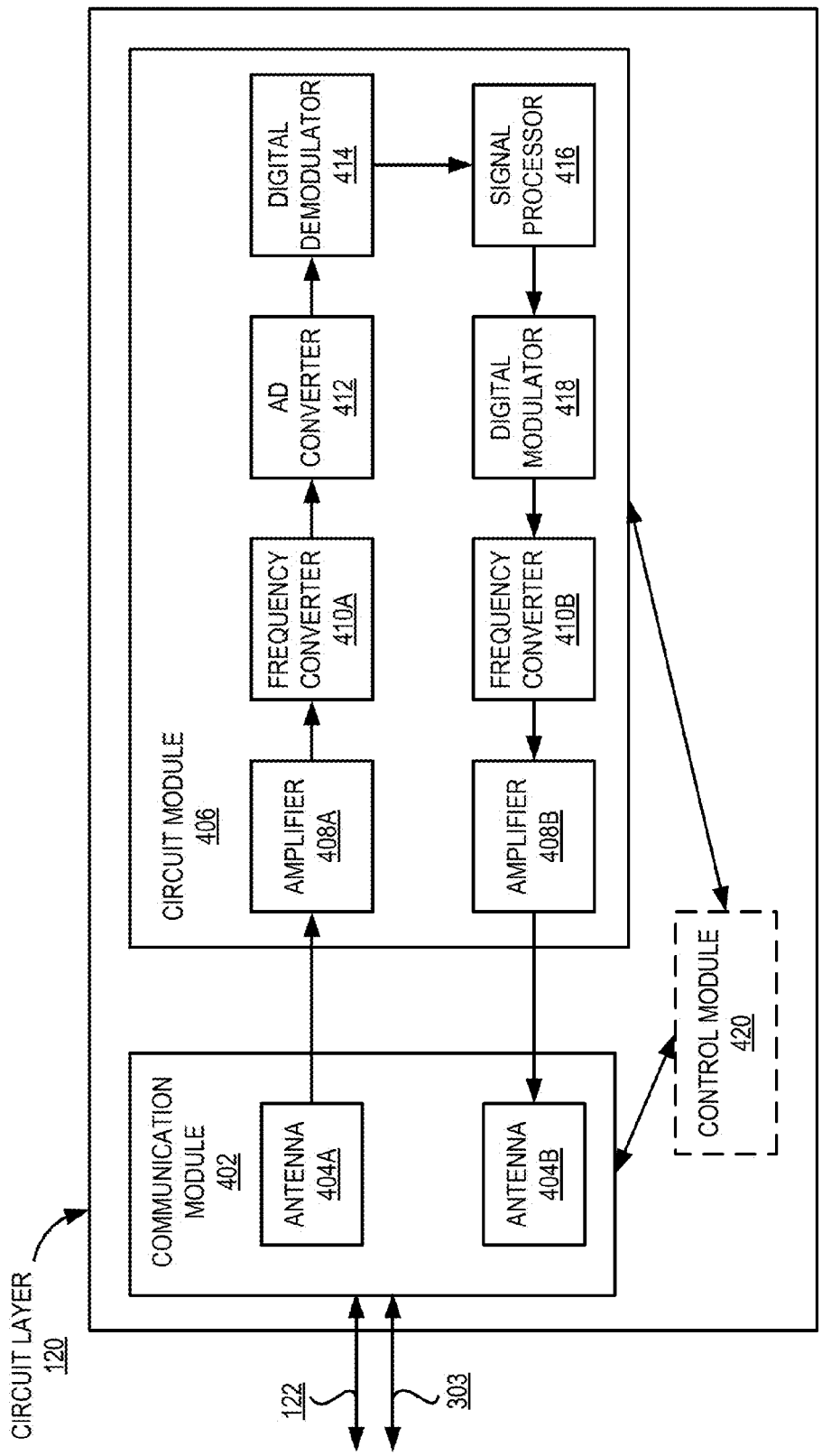
FIGS. 4A-4D are block diagrams illustrating a circuit layer according to various embodiments of the present invention.

FIG. 4A is a block diagram illustrating the circuit layer 120 according to one embodiment of the present invention. In the illustrated embodiment, the circuit layer 120 includes a communication module 402, a circuit module 406 and a control module 420, all of which are communicatively coupled to one another. Here, the control module 420 is depicted by a rectangle formed from a dashed line to indicate that it is an optional feature of the circuit layer 120. In one embodiment, the circuit layer 120 is communicatively coupled to the sensor layer 118 via the signal line 303. The communication via the signal line 303 is bidirectional. For example, the circuit layer 120 receives one or more parameter signals from the sensor layer 118 and transmits signals to the sensor layer 118 via the signal line 303. In one embodiment, the signal line 303 is a wired connection. In another embodiment, the signal line 303 is a wireless connection such as a wireless PAN and/or LAN connection. The circuit layer 120 is also communicatively coupled to the communication device 124 via the wireless channel 122. For example, the circuit layer 120 receives signals from the communication device 124 and transmits the one or more parameter signals to the communication device 124 via the wireless channel 122. In one embodiment, the wireless channel 122 and the signal line 303 are any combination of a wireless PAN and/or LAN connection.

The communication module 402 is an interface that transmits and receives parameter signals. For example, the communication module 402 is a transceiver that transmits and receives signals with the same circuits. In the illustrated embodiment, the communication module 402 is an interface through which the circuit layer 120 communicates with the sensor layer 118 via the signal line 303 and the communication device 124 via the wireless channel 122. In one embodiment, the communication module 402 includes one or more antennas 404A, 404B. The communication module 402 is communicatively coupled to the circuit module 406 and the control module 420.

The antennas 404A, 404B work similar to the antenna 316 described above in FIG. 3A, and so, that description will not be repeated here. In one embodiment, the antenna 404A is adapted to receive signals via the wireless channel 122 and the signal line 303, and the antenna 404B is adapted to transmit signals via the wireless channel 122 and the signal line 303. In another embodiment, both the antennas 404A, 404B are adapted to send and receive signals.

The circuit module 406 is a device that is adapted to process a signal. For example, the circuit module 406 is a thin-film circuit that is configured to process the parameter signal received from the sensor layer 118. In the illustrated embodiment, the circuit module 406 includes a third and a fourth amplifiers 408A, 408B, one or more frequency converters 410A, 410B, an analog-to-digital converter 412 ("AD converter 412"), a digital demodulator 414, a signal processor 416 and a digital modulator 418. The circuit module 406 is communicatively coupled to the communication module 402 and the control module 420.

The third and the fourth amplifiers 408A, 408B, the frequency converters 410A, 410B, the AD converter 412 and the digital modulator 418 work similar to the amplifiers 306, 307, the frequency converter 312, the AD converter 308 and the digital modulator 310 described above in FIG. 3A, and so, that description will not be repeated here. However, in one embodiment, the third amplifier 408A is a high-frequency amplifier and the fourth amplifier 408B is a high-frequency power amplifier. In another embodiment, the frequency converter 410A is adapted to convert a high-frequency signal to a baseband signal, while the frequency converter 410B is adapted to convert a baseband signal to a high-frequency signal, wherein a baseband signal is a signal whose frequencies are in baseband. A person having skill in the art will recognize that in one embodiment there are any number of third and fourth amplifiers 408A, 408B.

The digital demodulator 414 is any device that extracts a first signal from a second signal. For example, the digital demodulator 414 is an electronic circuit that extracts an original information-bearing signal from a modulated carrier signal. In the illustrated embodiment, the digital demodulator 414 extracts a signal related to a physical parameter of the tire 100 out of a signal received from the AD converter 412. In one embodiment, the digital demodulator 414 is adapted to perform opposite operations to the digital modulator 310. In another embodiment, the digital demodulator 414 and the digital modulator 418 are combined into a modem, wherein a modem is a device that is capable of performing signal modulation and demodulation.

The signal processor 416 is any device that performs signal processing. Examples of signal processing include, but are not limited to: filtering; smoothing; adaptive filtering; spectrum analysis; feature extraction; prediction; system identification; compression; and decompression. In one embodiment, the signal processor 416 is a digital signal processor. For example, the signal processor 416 is a digital circuit from one of Application-Specific Integrated Circuits ("ASICs"), Field-Programmable Gate Arrays ("FPGAs") and/or other specialized digital signal processors optimized for digital signal processing. The signal processor 416 is adapted to process signals received from the digital demodulator 414 and output processing results to the digital modulator 418.

The control module 420 is any device that generates control signals. For example, the control module 420 is one of: a controller; a microprocessor; and a dedicated state machine sequencer. In the illustrated embodiment, the control module 420 controls the circuit module 406 and the communication module 402. For example, the control module 420 generates a timing signal and uses the timing signal to synchronize the circuit module 406 and the communication module 402. In one embodiment, the control module 420 is communicatively coupled to the circuit module 406 and the communication module 402. For example, the control module 420 sends control signals to the circuit module 406 and the communication module 402 and receives feedback information from the circuit module 406 and the communication module 402. In another embodiment, the control module 420 exchanges control information with the sensor layer 118 and the communication device 124 via the communication module 402.

Figure 4B:
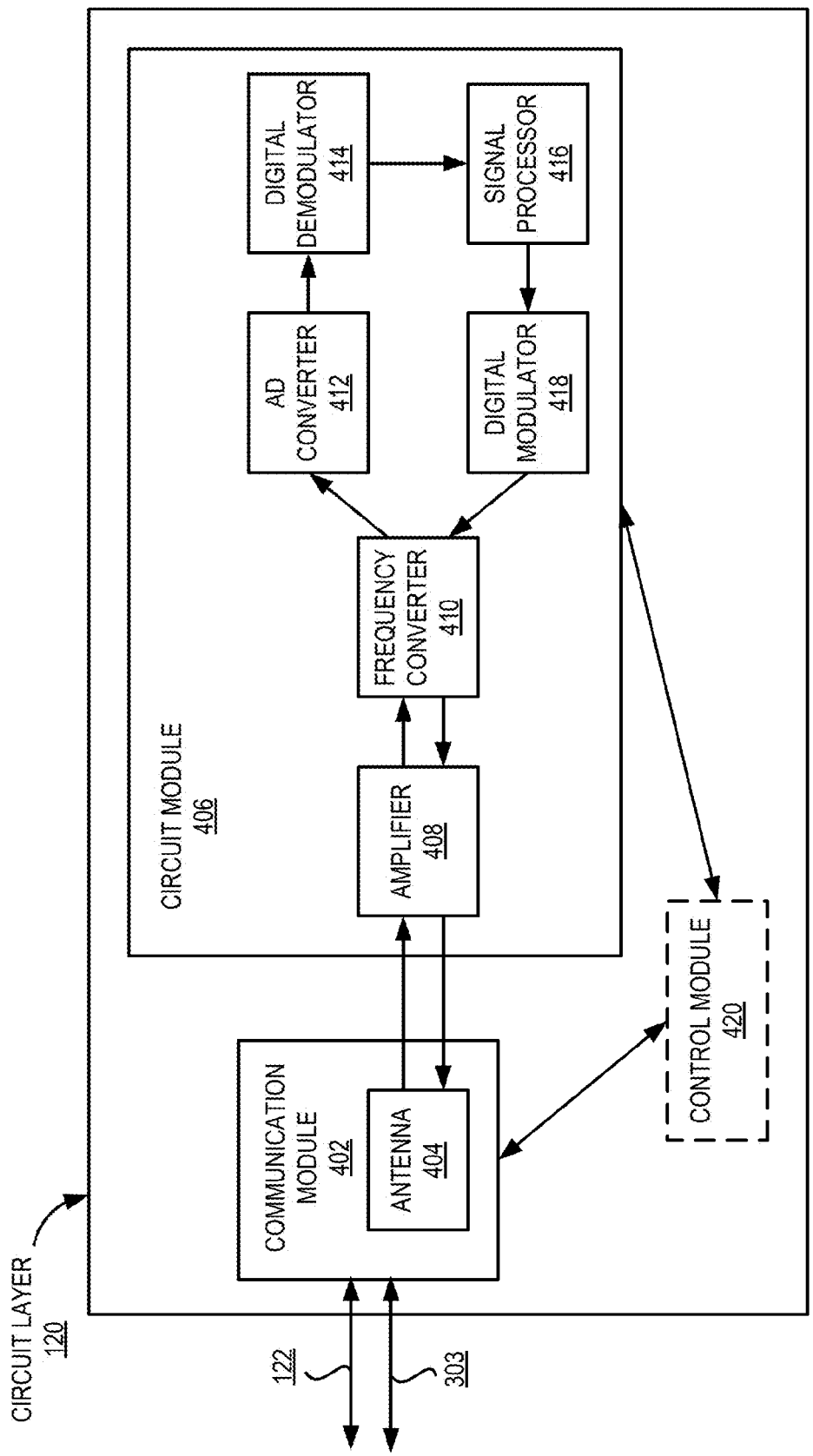

FIG. 4B is a block diagram illustrating another embodiment of the circuit layer 120 according to the present invention. The elements of FIG. 4B work similar to the elements of FIG. 4A described above, and so, that description will not be repeated here. Similar elements have similar reference numerals. However, the antennas 404A, 404B in FIG. 4A are combined into one antenna 404 as shown in FIG. 4B. Similarly, the third and fourth amplifiers 408A, 408B are combined into one amplifier 408, and the frequency converters 410A, 410B are combined into one frequency converter 410. In one embodiment, the digital modulator 418 and the digital demodulator 414 are combined into a modem.

Figure 4C:
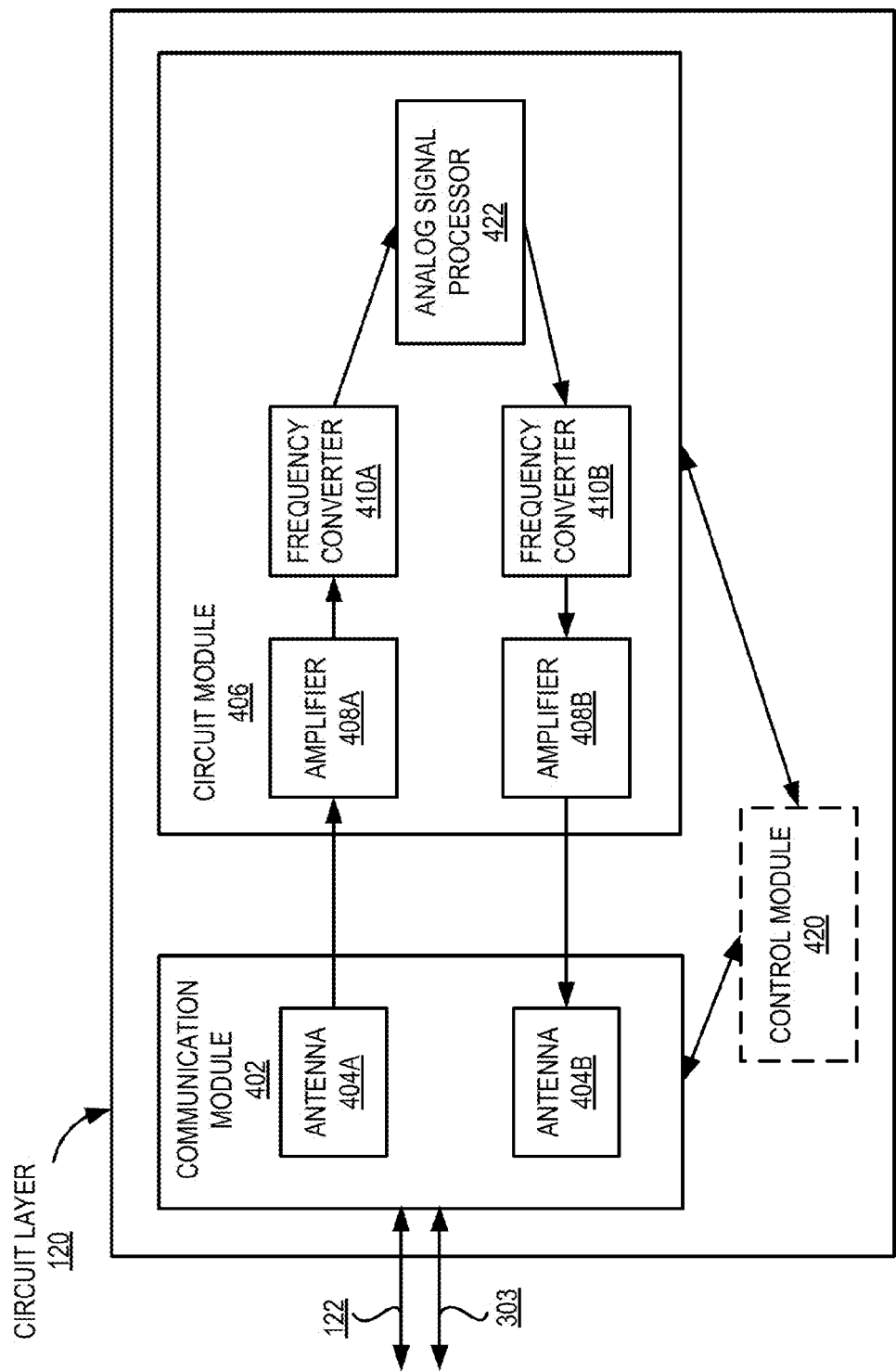

FIG. 4C is a block diagram illustrating another embodiment of the circuit layer 120 according to the present invention. The elements of FIG. 4C work similar to the elements of FIG. 4A described above, and so, the description will not be repeated here. Similar elements have similar reference numerals. However, in FIG. 4C the circuit module 406 includes one or more third and fourth amplifiers 408A, 408B, one or more frequency converters 410A-410B and an analog signal processor 422. The circuit module 406 is adapted to process a signal received from the communication module 402 in its analog form, without converting the signal into a digital signal.

The analog signal processor 422 is a device that processes analog signals. For example, the analog signal processor 422 is an electronic circuit that processes the analog signal received from the communication module 402. In one embodiment, the analog signal processor 422 performs one or more operations of filtering, smoothing, adaptive filtering, spectrum analysis, feature extraction, prediction, system identification, compression and/or decompression, etc., to the signal received from the communication module 402 by analog means.

Figure 4D:
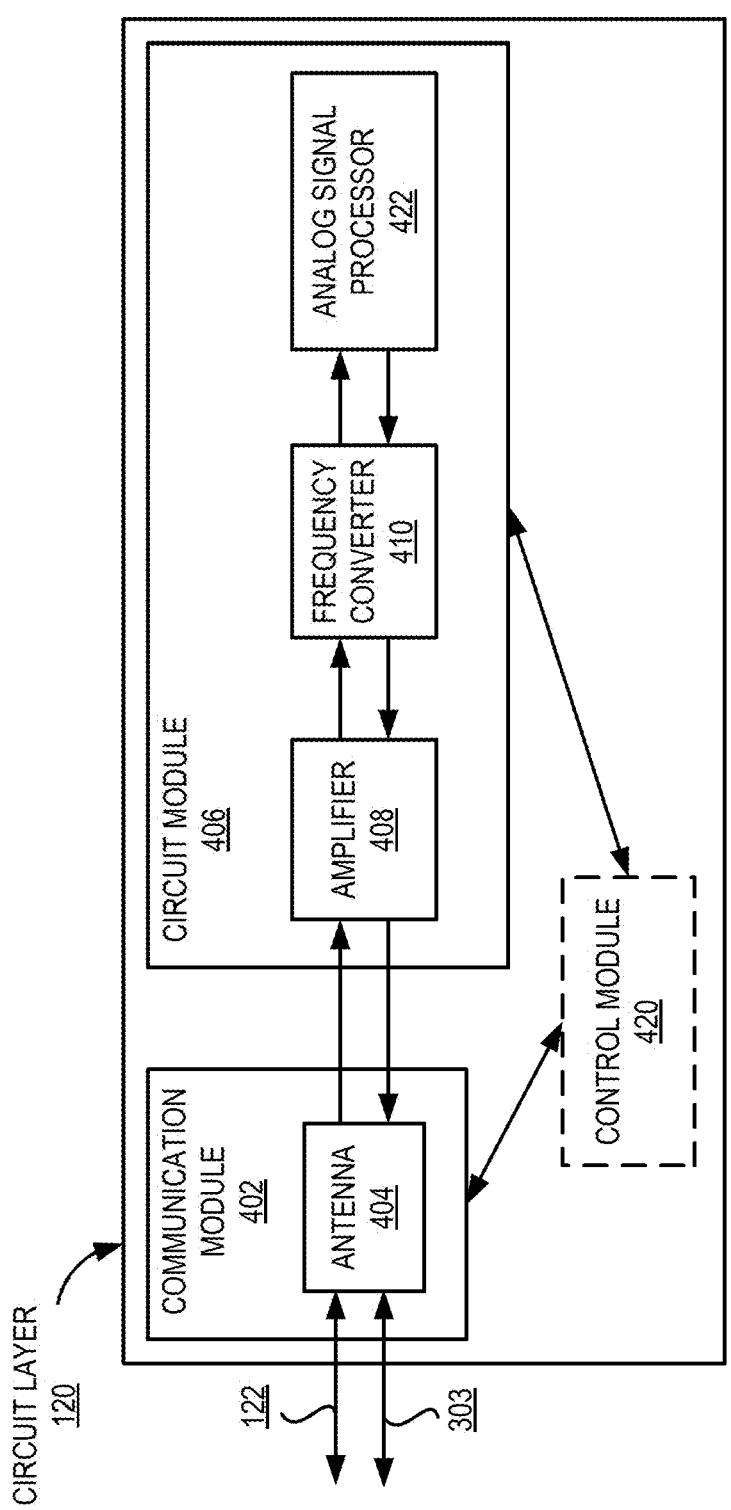

FIG. 4D is a block diagram illustrating another embodiment of the circuit layer 120 according to the present invention. The elements of FIG. 4D work similar to the elements of FIG. 4C described above, and so, the description will not be repeated here. Similar elements have similar reference numerals. However, the antennas 404A, 404B in FIG. 4C are combined into one antenna 404 as shown in FIG. 4D. Similarly, the third and fourth amplifiers 408A, 408B are combined into one amplifier 408 and the frequency converters 410A, 410B are combined into one frequency converter 410 as shown in FIG. 4D.

While FIGS. 4A-4B depicts various embodiments of the circuit layer 120 that processes parameter signals provided by the illustrated embodiment of the sensor layer 118 as shown in FIG. 3A according to the present invention, FIGS. 4C and 4D depicts other embodiments of the circuit layer 120 that processes parameter signals provided by the illustrated embodiment of the sensor layer 118 as shown in FIG. 3B.

Although a power supply module 320 is not depicted in FIGS. 4A-4D, one skilled in the art will recognize that in other embodiments the circuit layer 120 includes a power supply module 320 that supplies power to each component of the circuit layer 120. In another embodiment, an external power source is used to provide power for each component of the circuit layer 120. For example, an external minute battery is applied to supply power to the circuit layer 120.

Although the circuit layer 120 illustrated in FIGS. 4A-4D includes only one circuit module 406, one communication module 402 and one control module 420, one skilled in the art will recognize that the circuit layer 120 can include a plurality of these modules. For example, the circuit layer 120 includes a first and a second communication modules 402, a first and a second circuit modules 406 and a first and a second control modules 420. In one embodiment, the plurality of these modules can be adapted to process parameter signals that related to different physical parameters of the tire 100. For example, while the first communication module 402, the first circuit module 406 and the first control module 420 are configured to process a parameter signal related to the pressure of the tire 100, the second communication module 402, the second circuit module 406 and the second control module 420 are configured to process a parameter signal related to the temperature of the tire 100. In another embodiment, the plurality of these modules is configured to process parameter signals related to the same physical parameters of the tire 100.

FIG. 5A is a block diagram illustrating the circuit layer 120 disposed on the sensor layer 118 according to one embodiment of the present invention. The elements of FIG. 5A work similar to the elements of FIGS. 3A and 3B and FIGS. 4A and 4B described above, and so, the description will not be repeated here. Similar elements have similar reference numerals.

However, in the illustrated embodiment of FIG. 5A, the circuit layer 120 is disposed on the sensor layer 118. In one embodiment, the circuit layer 120 is placed directly on top of the sensor layer 118. The sensor layer 118 is communicatively coupled to the circuit layer 120. For example, in the illustrated embodiment the sensor layer 118 delivers the parameter signal of the tire 100 to the circuit layer 120 via signal line 502, and the sensor layer 118 and the circuit layer 120 exchange control information via signal line 508. In one embodiment, the signal lines 502 and 508 represent interlayer electrical wiring.

In one embodiment, the sensor layer 118 is also coupled to the circuit layer 120 via a power supply channel 504. For example, the sensor layer 118 supplies power to the circuit layer 120 via the power supply channel 504. In one embodiment, the power supply channel 504 is inter-layer electrical wiring. In another embodiment, an external power source (i.e., a minute battery) is applied to supply power to both the sensor layer 118 and the circuit layer 120.

In the illustrated embodiment, the sensor layer 118 includes a sensor module 302 and a power supply module 320. The sensor module 302 includes a sensor 304. In one embodiment, the sensor 304 is adapted to receive an input 301 from the tire 100, generate a parameter signal based on the input 301 and deliver the parameter signal to the circuit layer 120 via the signal line 502.

The power supply module 320 comprised within the sensor layer 118 is coupled to the sensor module 302 via the power supply channel 326A. In one embodiment, the power supply module 320 is configured to couple to the circuit layer 120 via the power supply channel 504. For example, the power supply module 320 supplies power to the circuit layer 120 via the power supply channel 504.

In the illustrated embodiment, the circuit layer 120 includes a communication module 402, a circuit module 406 and a control module 420, all of which are communicatively coupled to each other.

The circuit module 406 comprised within the circuit layer 120 includes a third and a fourth amplifiers 408A, 408B, an AD converter 412, a signal processor 416, a digital modulator 418 and a frequency converter 410. These elements comprised within the circuit module 406 work similar to the elements described in FIG. 4A, and so, the description will not be repeated here.

The control module 420 comprised within the circuit layer 120 is communicatively coupled to the communication module 402, the circuit module 406 and the sensor layer 118. In one embodiment, the control module 420 communicates control information with the sensor layer 118 via the signal line 508. In one embodiment, the signal line 508 is a connection with bidirectional communication. For example, the control module 420 sends a timing signal to synchronize the sensor layer 118, and the sensor layer 118 replies the control module 420 with a confirmation signal. In another embodiment, the control module 420 is configured to exchange control information with the communication device 124 via the communication module 402.

FIG. 5B is a block diagram illustrating the circuit layer 120 disposed on the sensor layer 118 according to another embodiment of the present invention. The elements of FIG. 5B work similar to the elements of FIG. 5A described above, and so, the description will not be repeated here. Similar elements have similar reference numerals. However, in the illustrated embodiment the circuit layer 120 is configured to process a parameter signal received from the sensor layer 118 in its analog form, and so, the AD converter 412, the signal processor 416 and the digital modulator 418 depicted in FIG. 5A are replaced by the analog signal processor 422 and the analog modulator 506 as shown in FIG. 5B.

Methods

Figure 6A:
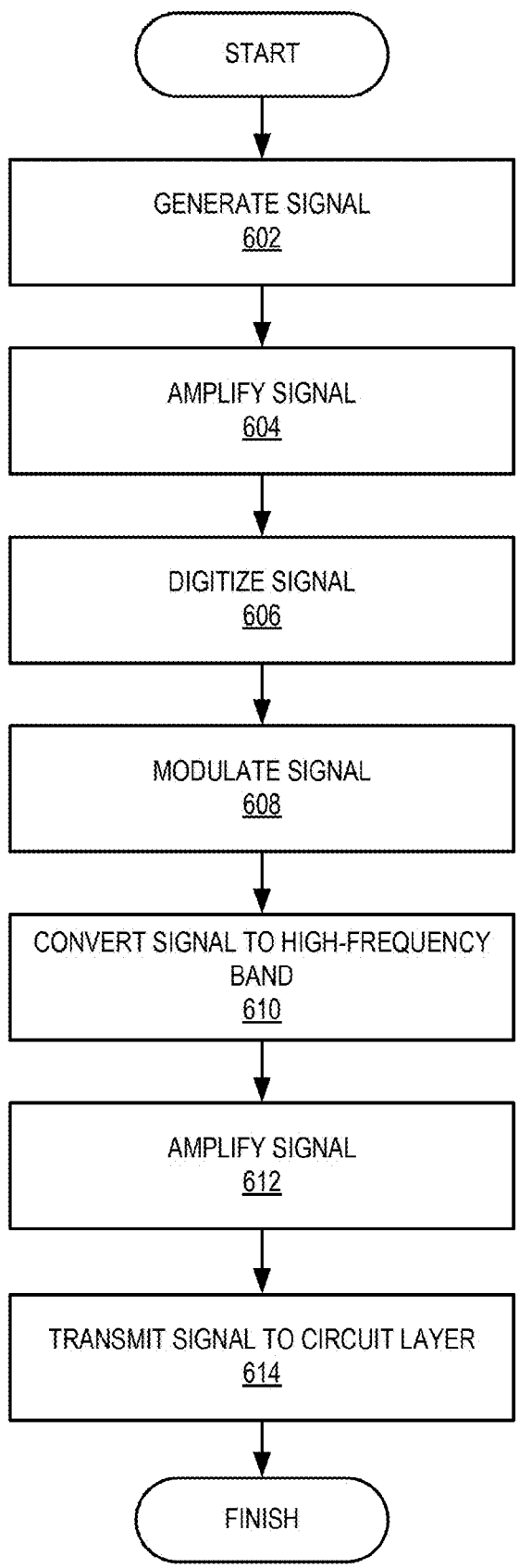
FIGS. 6A and 6B are flowcharts illustrating a method for providing a signal related to a physical parameter of the tire according to various embodiments of the present invention.

FIG. 6A is a flowchart illustrating a method for providing a parameter signal of the tire 100 according to one embodiment of the present invention. The method of FIG. 6A corresponds to the system of FIG. 3A. The sensor 304 receives an input 301 from the tire 100 and generates 602 a parameter signal based on the input 301. The generated parameter signal is an analog signal. The parameter signal is then passed to the amplifier 306. The amplifier 306 amplifies 604 the parameter signal and outputs the amplified parameter signal to the AD converter 308. The AD converter 308 digitizes 606 the amplified parameter signal and derives a digital parameter signal as output. The digital parameter signal is a digitized equivalent of the parameter signal of step 602. The digital modulator 310 modulates 608 the digital parameter signal and the frequency converter 312 converts 610 the modulated parameter signal to a high-frequency signal. The amplifier 307 amplifies 612 the high-frequency parameter signal and delivers the signal to the antenna 316. The antenna 316 then transmits 614 the parameter signal received from the amplifier 307 to the circuit layer 120. In one embodiment, the antenna 316 is a spiral antenna.

Figure 6B:
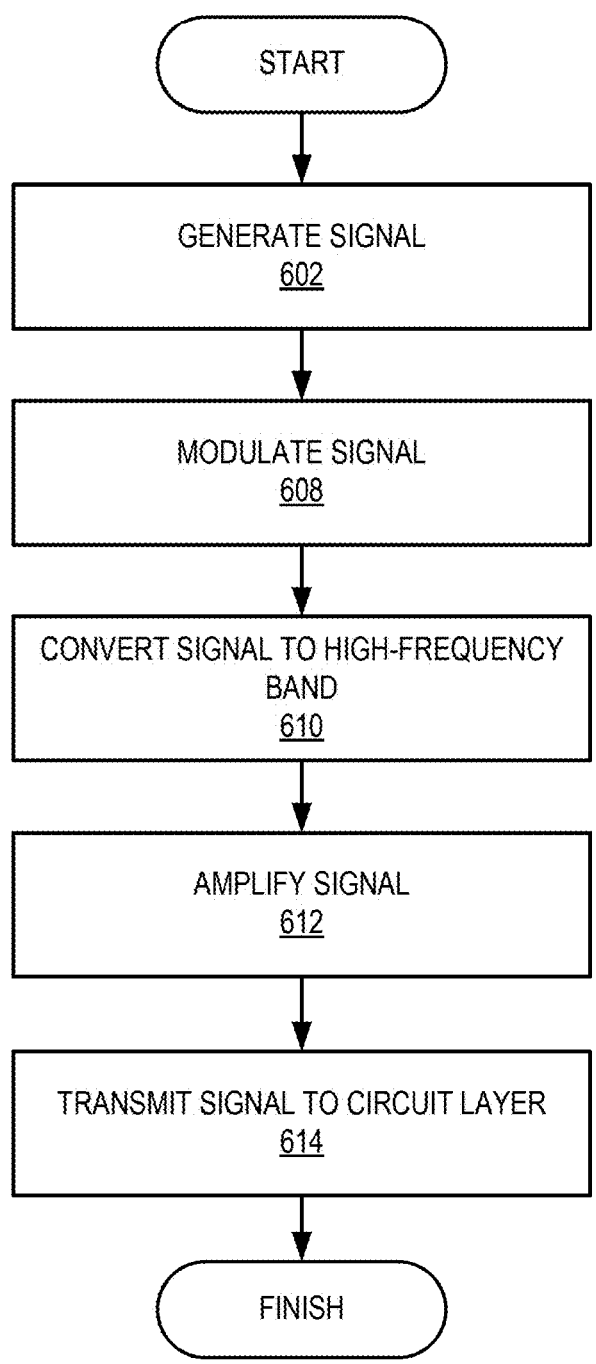

FIG. 6B is a flowchart illustrating a method for providing a parameter signal of the tire 100 according to another embodiment of the present invention. The method of FIG. 6B corresponds to the system of FIG. 3B. The sensor 304 receives an input 301 and generates a parameter signal. The generated signal is an analog signal and includes information about the physical parameter of the tire 100. The analog modulator 328 modulates 608 the analog parameter signal and outputs a modulated parameter signal to the frequency converter 312. The frequency converter 312 converts 610 the modulated parameter signal to a high-frequency parameter signal. The amplifier 307 then amplifies 612 the high-frequency parameter signal and passes the amplified parameter signal to the antenna 316. In one embodiment, the amplifier 307 is a high-frequency power amplifier. The antenna 316 then transmits 614 the amplified parameter signal to the circuit layer 120. In one embodiment, the antenna 316 is a spiral antenna.

Figure 7A:
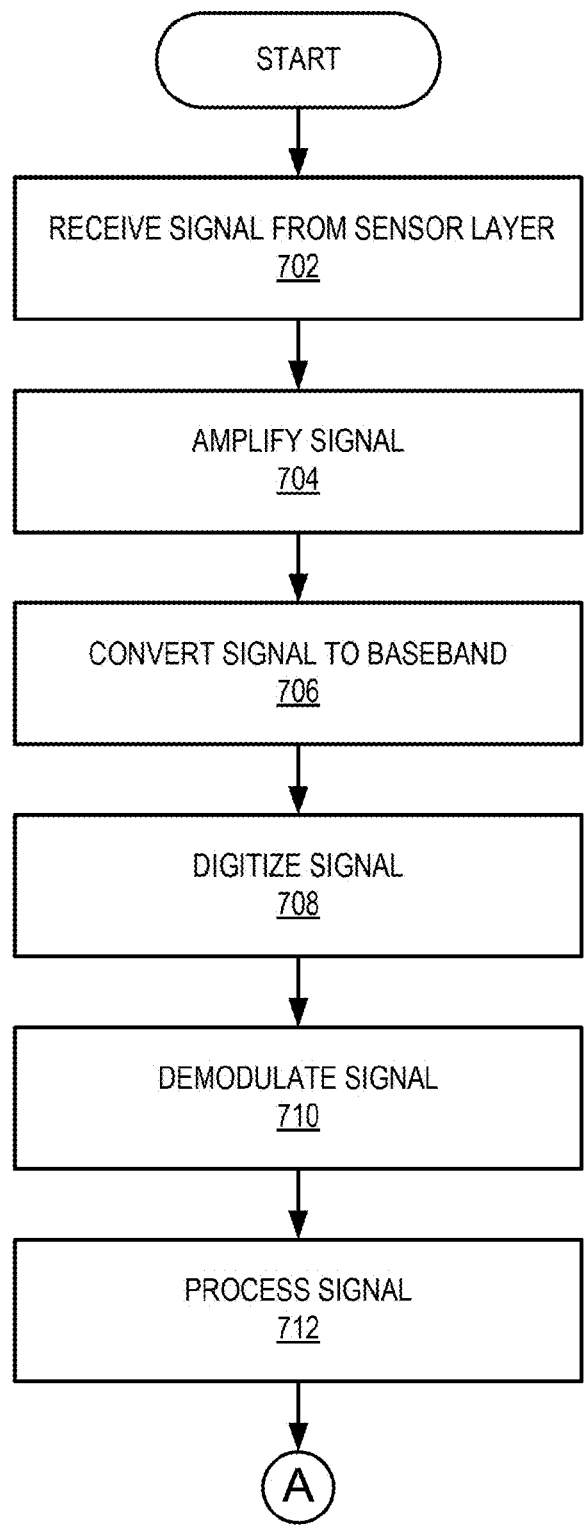
FIGS. 7A and 7B are flowcharts illustrating a method for processing a signal related to a physical parameter of the tire according to one embodiment of the present invention.
Figure 7B:
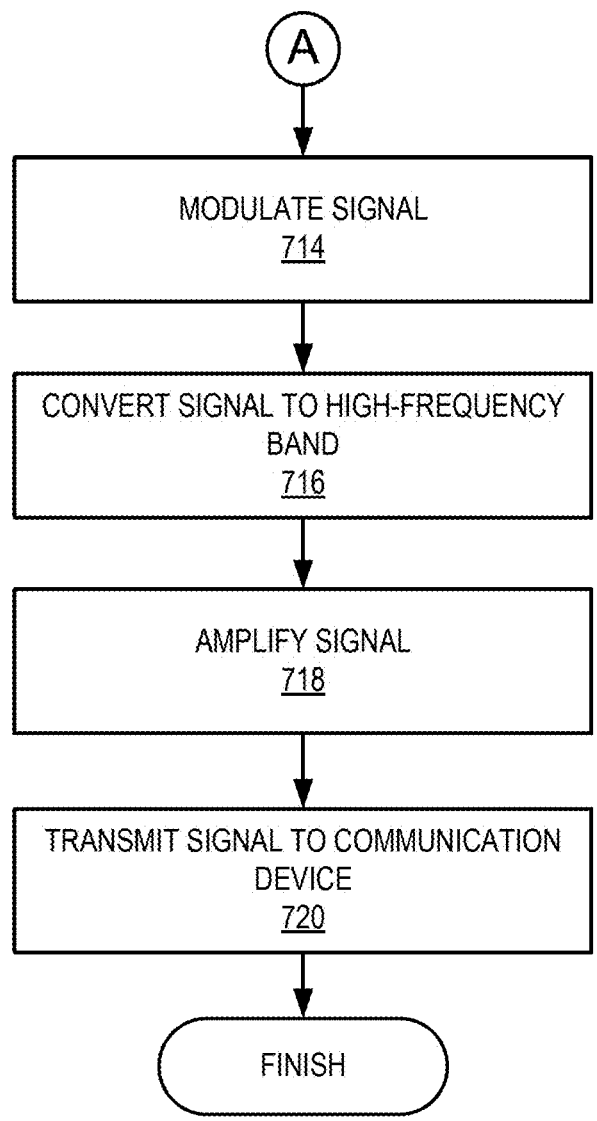

FIGS. 7A and 7B are flowcharts illustrating a method for processing a parameter signal of the tire 100 according to one embodiment of the present invention. The method of FIGS. 7A and 7B corresponds to the system of FIG. 4A. The antenna 404A comprised within the circuit layer 120 receives 702 the parameter signal from the sensor layer 118. In one embodiment, the third antenna 404A is a spiral antenna. In one embodiment, the received parameter signal is a high-frequency parameter signal. The third amplifier 408A amplifies 704 the received signal and passes the amplified signal to the frequency converter 410A. In one embodiment, the third amplifier 408A is a high-frequency amplifier. The frequency converter 410A converts 706 the amplified high-frequency signal into a baseband signal. The baseband signal includes information about the physical parameter of the tire 100. In one embodiment, the baseband signal is an analog signal. The AD converter 412 digitizes 708 the baseband signal into a digital signal. The digital signal includes the information about the physical parameter of the tire 100. The digital demodulator 414 demodulates 710 the digital signal and generates a demodulated signal as output. The signal processor 416 then processes 712 the demodulated signal. The processing of the demodulated signal includes at least one of the operations: filtering; smoothing; adaptive filtering; spectrum analysis; feature extraction; prediction; system identification compression; and/or decompression, etc. In one embodiment, the signal processor 416 is a digital signal processor. The signal processor 416 generates an output signal and forwards the output signal to the digital modulator 418.

Referring to FIG. 7B, the digital modulator 418 modulates 714 the output signal of the signal processor 416. In one embodiment, the digital demodulator 414 and the digital modulator 418 are combined into a modem. The frequency converter 410B converts 716 the modulated signal to a high-frequency signal. In one embodiment, the frequency converters 410A, 410B are combined into one frequency inverter 410. The fourth amplifier 408B amplifies 718 the high-frequency signal and forwards the amplified signal to the antenna 404B. In one embodiment, the fourth amplifier 408B is a high-frequency power amplifier. In another embodiment, the third and fourth amplifiers 408A, 408B are combined into one amplifier 408. The antenna 404B then transmits 720 the amplified signal to the communication device 124. In one embodiment, the antenna 404B is a spiral antenna. In another embodiment, the antennas 404A, 404B are combined into one antenna 404.

Figure 7C:
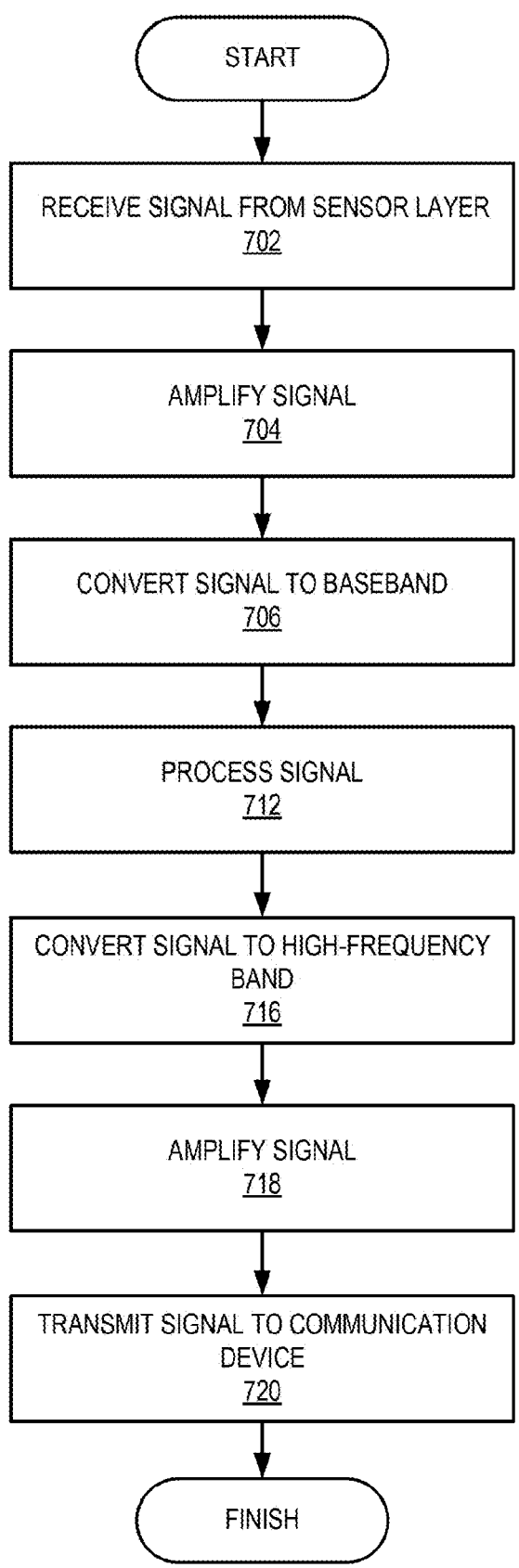
FIG. 7C is a flowchart illustrating a method for processing a signal related to a physical parameter of the tire according to one embodiment of the present invention.

FIG. 7C is a flowchart illustrating a method for processing a parameter signal of the tire 100 according to another embodiment of the present invention. The method of FIG. 7C corresponds to the system of FIG. 4C. Steps 702-706 work similar to steps 702-706 described in FIG. 7A, and so, the description will not be repeated here. At step 712 of FIG. 7C, the analog signal processor 422 processes the signal received from step 706 and forwards a processing result to step 716. The processing of the signal includes at least one of the operations: filtering; smoothing; adaptive filtering; spectrum analysis; feature extraction; prediction; system identification; compression; and/or decompression, etc. Steps 716-720 work similar to steps 716-720 described in FIG. 7B, and so, the description will not be repeated here.

Figure 8A:
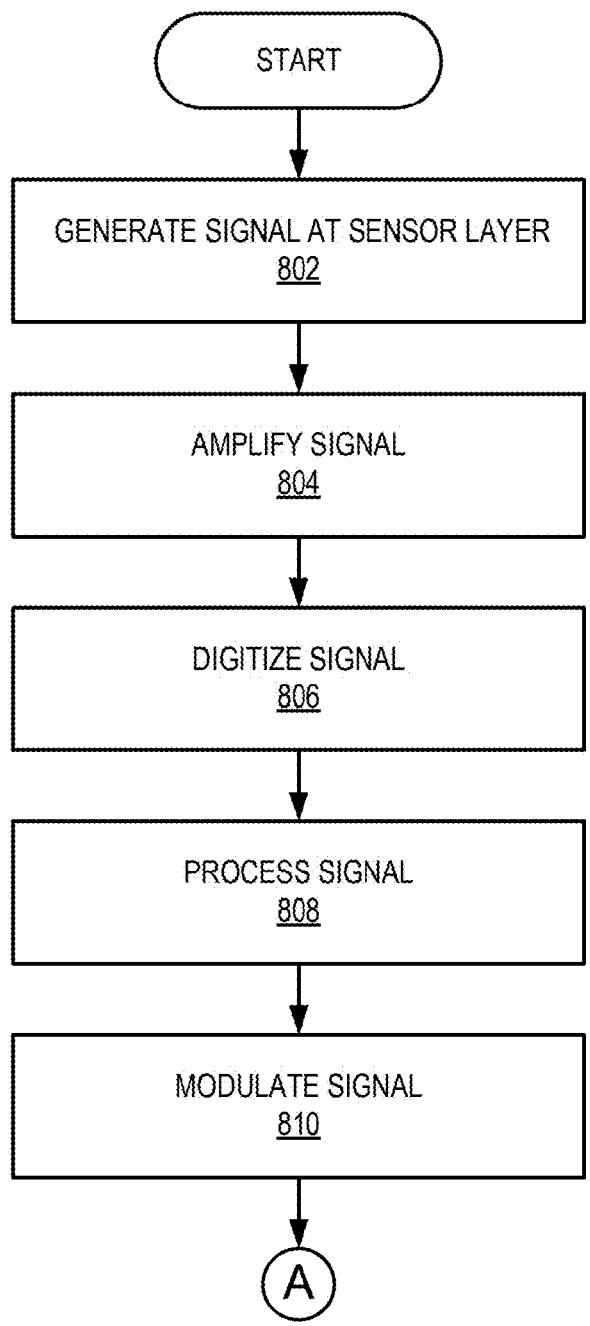
FIGS. 8A and 8B are flowcharts illustrating a method for providing and processing a signal related to the physical parameter of a tire according to one embodiment of the present invention.
Figure 8B:
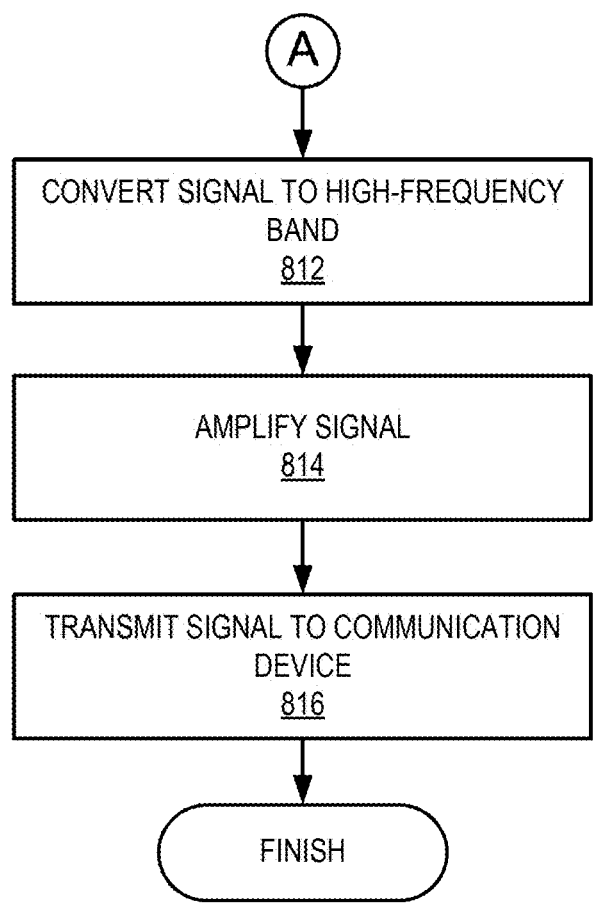

FIGS. 8A and 8B are flowcharts illustrating a method for providing and processing a parameter signal of the tire 100 according to one embodiment of the present invention. The method of FIGS. 8A and 8B corresponds to the system of FIG. 5A. Turning to FIG. 8A, the sensor 304 comprised within the sensor layer 118 receives an input 301 related to a physical parameter of the tire 100 (e.g., pressure, strain force, centrifugal force, temperature, etc.), and generates 802 a parameter signal based on the input 301 at the sensor layer 118. The sensor 304 forwards the parameter signal to the amplifier 408A comprised within the circuit layer 120. The third amplifier 408A amplifies 804 the signal and passes the amplified signal to the AD converter 412. In one embodiment, the third amplifier 408A is an analog amplifier. The AD converter 412 digitizes 806 the amplified signal into a digital signal and then the signal processor 416 processes 808 the digital signal. In one embodiment, the signal processor 416 is a digital signal processor. The processing of the digital signal includes one or more operations of: filtering; smoothing; adaptive filtering; spectrum analysis; feature extraction; prediction; system identification compression; and/or decompression, etc. The digital modulator 418 then modulates 810 a processing result from step 808 and generates a modulated signal.

Now referring to FIG. 8B, the frequency converter 410 converts 812 the modulated signal to a high-frequency signal. The fourth amplifier 408B amplifies 814 the high-frequency signal. In one embodiment, the fourth amplifier 408B is a high-frequency power amplifier. In another embodiment, the third and fourth amplifiers 408A, 408B are combined into one amplifier 408. The fourth amplifier 408B then forwards the amplified signal to the antenna 404. In one embodiment, the antenna 404 is a spiral antenna. The antenna 404 transmits 816 the amplified signal to the communication device.

Figure 8C:
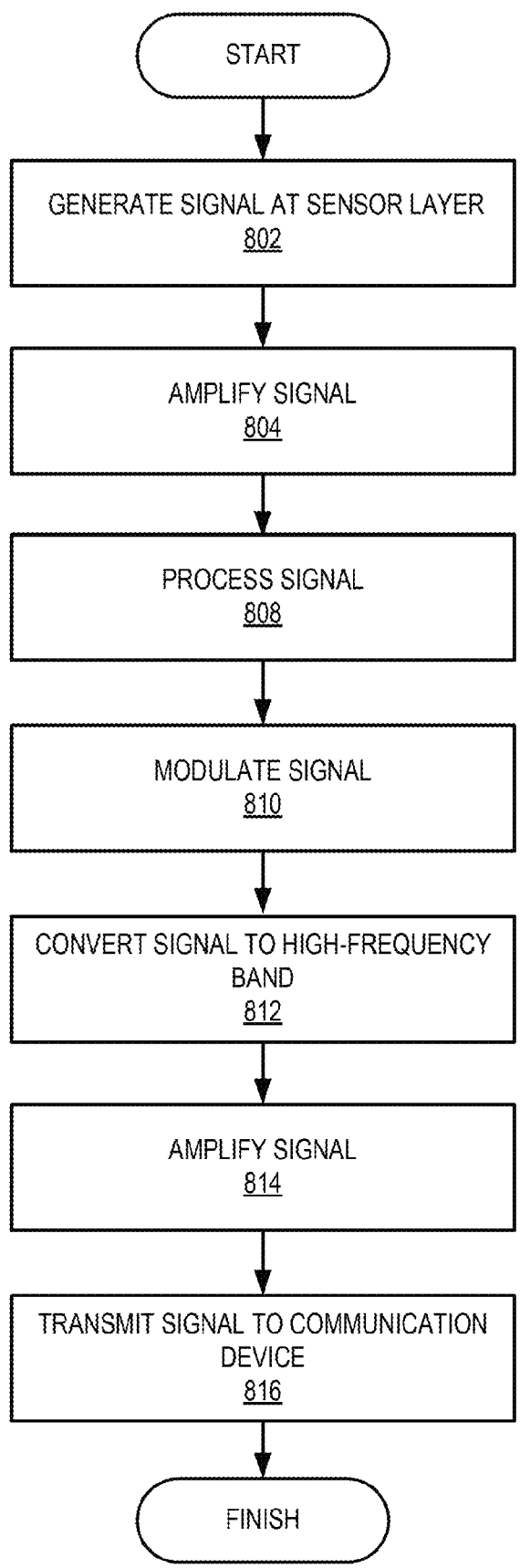
FIG. 8C is a flowchart illustrating a method for providing and processing a signal related to a physical parameter of the tire according to one embodiment of the present invention.

FIG. 8C is a flowchart illustrating a method for providing and processing a parameter signal of the tire 100 according to another embodiment of the present invention. The method of FIG. 8C corresponds to the system of FIG. 5B. Steps 802-804 work similar to steps 802-804 described above in FIG. 8A, and so, the description will not be repeated here. At step 808, the analog signal processor 422 processes the signal received from step 804 in its analog form and forwards an output signal to the analog modulator 506. The analog modulator 506 modulates 810 the signal received from step 808. Steps 812-816 work similar to steps 812-816 described above in FIGS. 8A-8B, and so, the description will not be repeated here.

Various embodiments of the present invention described above provide numerous advantages not present in the prior art. For example, the sensor layer 118 and the circuit layer 120 have a range of thickness in a nanometer scale from one hundred nanometers (100 nanometers) to one thousand micrometers (1,000 micrometers), which allows a plurality of sensor layers 118 and circuit layers 120 embedded in the tire 100 (as described above). The plurality of sensor layers 118 and circuit layers 120 are configured to cooperatively measure the physical parameter affecting every portion of the tire 100 without causing any measurable performance degradation of the tire 100.

In one embodiment, the circuit layer 120 is disposed in parallel with the sensor layer 118. The circuit layer 120 is superposed on the sensor layer 118. For example, the circuit layer 120 is placed atop on the sensor layer 118. The sensor layer 118 is configured to communicatively couple to the circuit layer 120 via inter-layer electrical wiring. The communication via the electrical wiring is beneficial, because it eliminates the use of antennas and other transmitting/receiving circuits for wireless communication and therefore reduces the number of circuits embedded in the tire 100.

In another embodiment, the sensor layer 118 comprises a power supply module 320. The power supply module 320 is configured to supply power to the sensor layer 118. The circuit layer 120 is placed atop on the sensor layer 118. The power supply module 320 is also configured to supply power to the circuit layer 120 via inter-layer electrical wiring. This self-sufficiency of power supply without using an external power source eliminates the problem of power shortage when hundreds or even thousands of sensors and transistors are embedded in the tire 100 (e.g., 100 to 1,000,000 sensors and 100 to 1,000,000 transistors).

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for measuring physical parameters of a tire, the system comprising:
   a sensor layer configured as a first thin film and embedded in the tire, the sensor layer providing a signal related to a physical parameter of the tire, the physical parameter of the tire describing a force affecting the tire, the sensor layer comprising a sensor module configured to generate and output the signal related to the physical parameter of the tire;
   a circuit layer communicatively coupled to the sensor layer, the circuit layer configured as a second thin film and embedded in the tire, the circuit layer processing the signal provided by the sensor layer; and
   a power supply module coupled to the sensor module via a first power supply channel, the power supply module configured to supply power to the sensor module via the first power supply channel.

2. The system of claim 1, wherein the physical parameter of the tire is one of: centrifugal force; acceleration; inner pressure; ground contact pressure; temperature; sidewall flex; stress; and strain.

3. The system of claim 1, wherein the sensor layer and the circuit layer are embedded in at least one of: a tread; a shoulder; and a portion of a sidewall of the tire.

4. The system of claim 3, wherein the sensor layer and the circuit layer are further configured to continuously measure the physical parameter of the tire acting upon the at least one of: the tread; the shoulder; and the portion of the sidewall of the tire.

5. The system of claim 1, wherein the circuit layer is communicatively coupled to the sensor layer via wireless communication.

6. The system of claim 1, wherein the circuit layer is disposed on the sensor layer and communicatively coupled to the sensor layer via electrical wiring.

7. The system of claim 1, wherein the sensor layer further comprises:
   a first communication module communicatively coupled to the sensor module, the first communication module configured to receive the signal from the sensor module and transmit the signal to the circuit layer; and
   wherein the power supply module is coupled to the first communication module via a second power supply channel and configured to supply power to the first communication module via the second power supply channel.

8. The system of claim 1, wherein the circuit layer further comprises:
   a circuit module configured to process the signal provided by the sensor layer and generate a processed signal corresponding to the signal provided by the sensor layer; and
   a second communication module communicatively coupled to the circuit module, the second communication module configured to transmit the processed signal to an external communication device.

9. The system of claim 8, wherein the second communication module is further configured to receive the signal provided by the sensor layer and forward the signal to the circuit module for processing.

10. A method for measuring physical parameters of a tire using a first and a second thin films embedded in the tire, the method comprising:
    generating a first signal related to a physical parameter of the tire using the first thin film, the physical parameter of the tire describing a force affecting the tire;
    outputting the first signal to the second thin film;
    processing the first signal using the second thin film to generate a processed first signal;
    outputting the processed first signal to an external device, and
    supplying power to the first thin film via a power supply channel.

11. The method of claim 10, wherein the physical parameter of the tire is one of: centrifugal force; acceleration; inner pressure; ground contact pressure; temperature; sidewall flex; stress; and strain.

12. The method of claim 10, wherein the first and the second thin films are embedded in at least one of: a tread; a shoulder; and a portion of a sidewall of the tire.

13. The method of claim 10, wherein the external device receives the processed first signal and measures, based on the processed first signal, the physical parameter of the tire acting upon at least one of: the tread; the shoulder; and the portion of the sidewall of the tire.

14. The method of claim 13, wherein the first and the second thin films are configured to work with the external device so that the physical parameter is measured continuously.

15. The method of claim 10, wherein outputting the first signal to the second thin film comprises:
amplifying the first signal;
digitizing the first signal;
modulating the first signal;
converting the first signal to a high-frequency band;
amplifying the first signal; and
transmitting the first signal to the second thin film.

16. The method of claim 10, wherein outputting the first signal to the second thin film comprises:
modulating the first signal;
converting the first signal to a high-frequency band;
amplifying the first signal; and
transmitting the first signal to the second thin film.

17. The method of claim 10, wherein processing the first signal and outputting the processed first signal to the external device comprises:
amplifying the first signal;
converting the first signal to baseband;
digitizing the first signal;
demodulating the first signal;
processing the first signal to generate the processed first signal;
modulating the processed first signal;
converting the processed first signal to a high-frequency band;
amplifying the processed first signal; and
transmitting the processed first signal to the external communication device.

18. The method of claim 10, wherein processing the first signal and outputting the processed first signal to the external device comprises:
amplifying the first signal;
converting the first signal to baseband;
processing the first signal to generate the processed first signal;
converting the processed first signal to a high-frequency band;
amplifying the processed first signal; and
transmitting the processed first signal to the external communication device.

19. The method of claim 10, wherein processing the first signal and outputting the processed first signal to the external device comprises:
amplifying the first signal;
digitizing the first signal;
processing the first signal to generate the processed first signal;
modulating the processed first signal;
converting the processed first signal to a high-frequency band;
amplifying the processed first signal; and
transmitting the processed first signal to the external communication device.

* * * * *